US012537285B2

(12) United States Patent
Kikuchi et al.

(10) Patent No.: US 12,537,285 B2
(45) Date of Patent: Jan. 27, 2026

(54) ANTENNA DEVICE AND ELECTRONIC EQUIPMENT

(71) Applicant: Panasonic Intellectual Property Management Co., Ltd., Osaka (JP)

(72) Inventors: Hironori Kikuchi, Miyagi (JP); Kenji Nishikawa, Hyogo (JP); Kazuya Tani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 164 days.

(21) Appl. No.: 18/541,128

(22) Filed: Dec. 15, 2023

(65) Prior Publication Data

US 2024/0145899 A1 May 2, 2024

Related U.S. Application Data

(63) Continuation of application No. PCT/JP2022/019799, filed on May 10, 2022.

(30) Foreign Application Priority Data

Jun. 29, 2021 (JP) ................................. 2021-107998

(51) Int. Cl.
*H01Q 1/22* (2006.01)
*H01Q 1/42* (2006.01)
*H01Q 21/08* (2006.01)

(52) U.S. Cl.
CPC ................. *H01Q 1/22* (2013.01); *H01Q 1/42* (2013.01); *H01Q 21/08* (2013.01)

(58) Field of Classification Search
CPC H01Q 1/22; H01Q 1/42; H01Q 21/08; H01Q 1/02; H01Q 1/246; H01Q 1/24
See application file for complete search history.

(56) References Cited

U.S. PATENT DOCUMENTS 6,344,803 B1 2/2002 Tsubouchi et al.
6,690,335 B2 * 2/2004 Onishi ..................... H01Q 1/00 343/872

(Continued)

FOREIGN PATENT DOCUMENTS

JP 2001-044734 A 2/2001
JP 2005-091082 A 4/2005

(Continued)

OTHER PUBLICATIONS

International Search Report for related Application No. PCT/JP2022/019799, mailed Aug. 16, 2022.

*Primary Examiner* — Seung H Lee
(74) *Attorney, Agent, or Firm* — Renner, Otto, Boisselle & Sklar, LLP

(57) ABSTRACT

An antenna device including: an antenna module for performing communication at a predetermined communication frequency; a base having conductivity, the base including a first surface and a first recess, the first recess accommodating the antenna module and being disposed on the first surface; a radome that is a dielectric, the radome including a second surface facing the first surface of the base and a second recess which faces the first recess and is disposed on the second surface; and a waterproof structure for waterproofing the antenna module, the waterproof structure being disposed between the first surface and the second surface. The antenna module includes one or a plurality of antenna elements, and an antenna surface on which the one or plurality of antenna elements are disposed. The antenna module is accommodated in the first recess to cause the antenna surface to project from the first surface into the second recess.

23 Claims, 16 Drawing Sheets

(56) References Cited

U.S. PATENT DOCUMENTS

| | | | | |
|---|---|---|---|---|
| 7,129,906 | B2 * | 10/2006 | Yoneya | H01Q 1/3275<br>343/702 |
| 11,237,526 | B2 * | 2/2022 | Kita | H01Q 9/26 |
| 2005/0057904 | A1 | 3/2005 | Nakabuchi | |
| 2017/0222312 | A1 | 8/2017 | Sudo et al. | |

FOREIGN PATENT DOCUMENTS

| | | | | |
|---|---|---|---|---|
| KR | 20220038931 | A * | 3/2022 | H01Q 1/243 |
| WO | 2016/059961 | A1 | 4/2016 | |

* cited by examiner

ANTENNA DEVICE AND ELECTRONIC EQUIPMENT

BACKGROUND

1. Technical Field

The present disclosure relates to an antenna device and electronic equipment.

2. Description of the Related Art

Patent Literature (PTL) 1 discloses roadside radio equipment as an antenna device. PTL 1 describes that a housing is configured to include a base which has a radio device body accommodating recess and an antenna housing recess disposed back to back and in which a surface of the antenna housing recess serves as a radio wave reflection surface, a base cover that covers the radio device body accommodating recess of the base and forms a radio device body accommodating portion together with the base to accommodate a radio device body, and an antenna cover that covers the antenna housing recess of the base and forms an antenna housing portion together with the base to house an antenna substrate, the radio device body is accommodated in the radio device body accommodating portion, and the antenna substrate is housed in the antenna housing portion.

PTL 1 is Unexamined Japanese Patent Publication No. 2001-44734.

SUMMARY

However, the antenna performance is not sufficiently improved in the antenna device described in PTL 1.

The present disclosure provides an antenna device and electronic equipment in which the waterproofing performance and antenna performance can be improved.

The antenna device according to one aspect of the present disclosure includes: an antenna module for performing communication at a predetermined communication frequency; a base having conductivity, the base including a first surface and a first recess, the first recess accommodating the antenna module and being disposed on the first surface; a radome that is a dielectric, the radome including a second surface facing the first surface of the base and a second recess which faces the first recess and is disposed on the second surface; and a waterproof structure for waterproofing the antenna module, the waterproof structure being disposed between the first surface of the base and the second surface of the radome. The antenna module includes one or a plurality of antenna elements, and an antenna surface on which the one or plurality of antenna elements are disposed. The antenna module is accommodated in the first recess to cause the antenna surface to project from the first surface into the second recess.

The electronic equipment according to one aspect of the present disclosure includes: the antenna device described above; a communication circuit connected to the antenna device; and a metal housing that accommodates the communication circuit. The base is a part of the metal housing. The first surface of the base is an outer surface of the metal housing.

According to the aspects of the present disclosure, the waterproofing performance and the antenna performance can be improved.

DETAILED DESCRIPTION

1. Exemplary Embodiment

[1.1 Overview]

Figure 1:
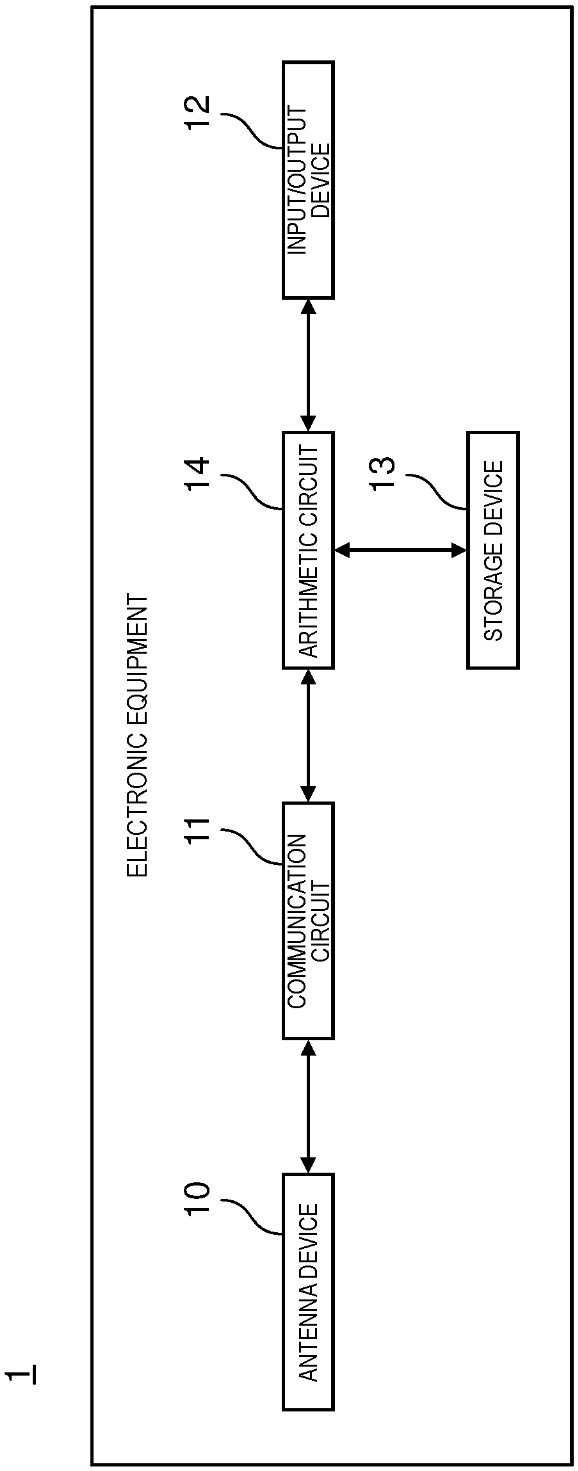
FIG. 1 is a block diagram of a configuration example of electronic equipment including an antenna device according to an embodiment.

FIG. 1 is a block diagram of a configuration example of electronic equipment 1 according to the exemplary embodiment. Electronic equipment 1 in FIG. 1 is a tablet terminal. Electronic equipment 1 includes antenna device 10, communication circuit 11, input/output device 12, storage device 13, and arithmetic circuit 14.

Figure 2:
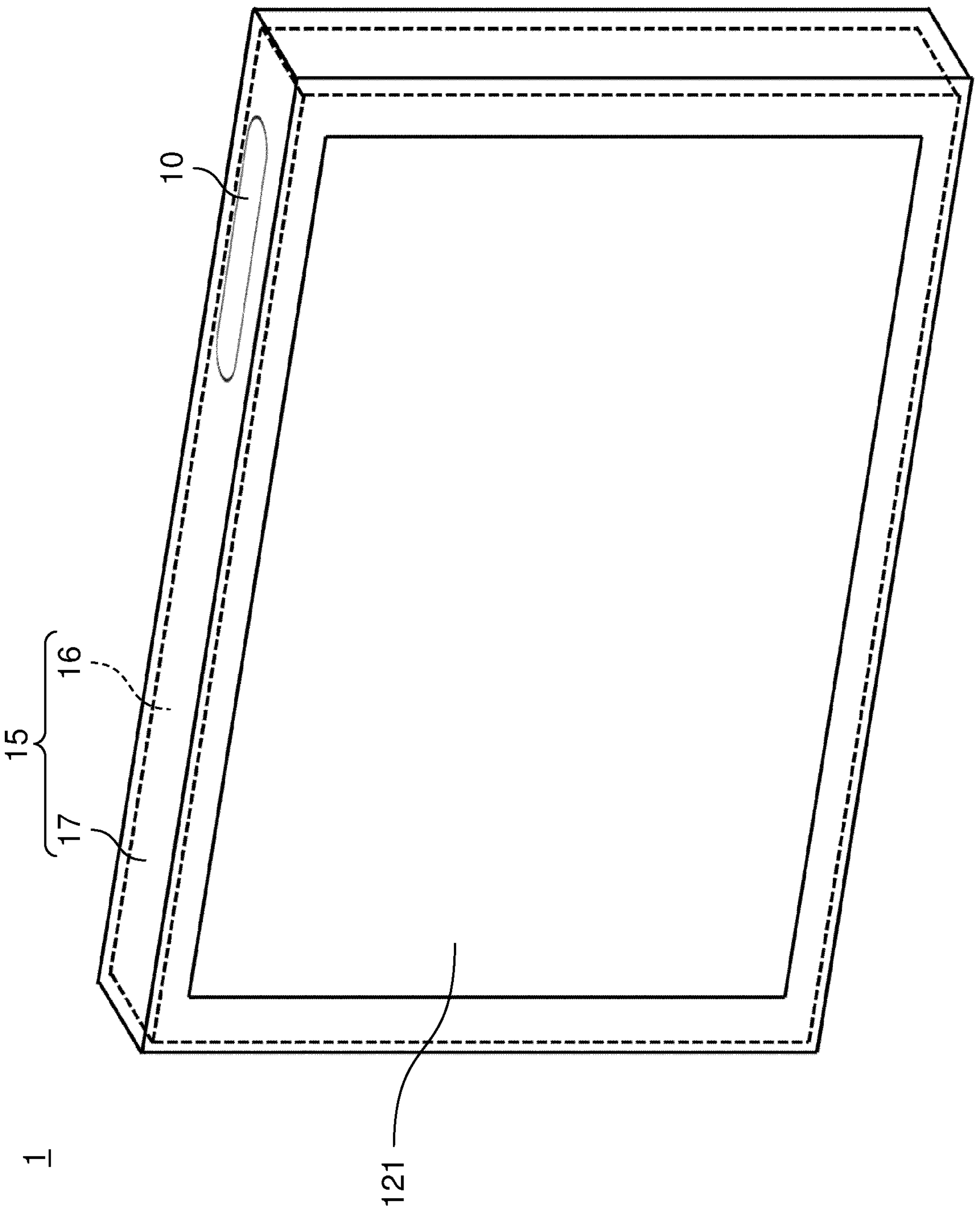
FIG. 2 is a perspective view of the electronic equipment in FIG. 1.
Figure 3:
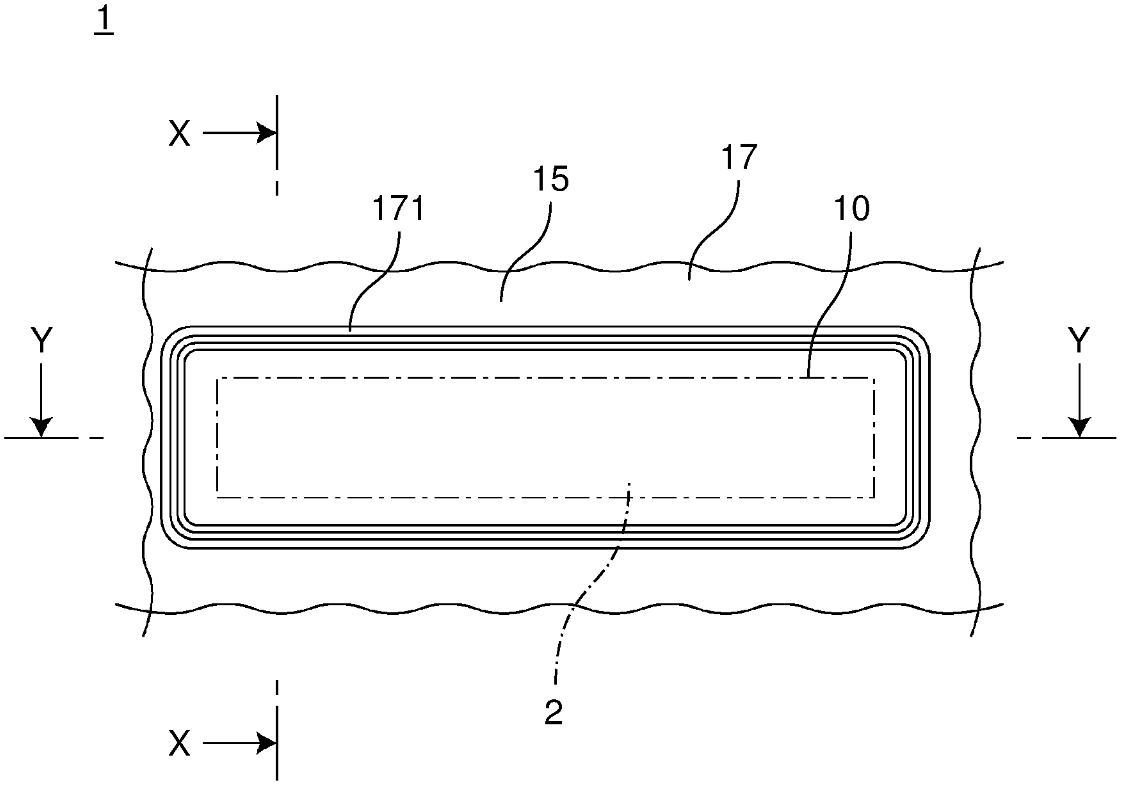
FIG. 3 is a side view of the electronic equipment of FIG. 1.

FIG. 2 is a perspective view of electronic equipment 1. Electronic equipment 1 includes housing 15 that accommodates antenna device 10, communication circuit 11, input/output device 12, storage device 13, and arithmetic circuit 14. FIG. 3 is a side view of electronic equipment 1. As illustrated in FIGS. 2 and 3, antenna device 10 is accommodated in housing 15 to be partially exposed from a side surface of housing 15.

Figure 4:
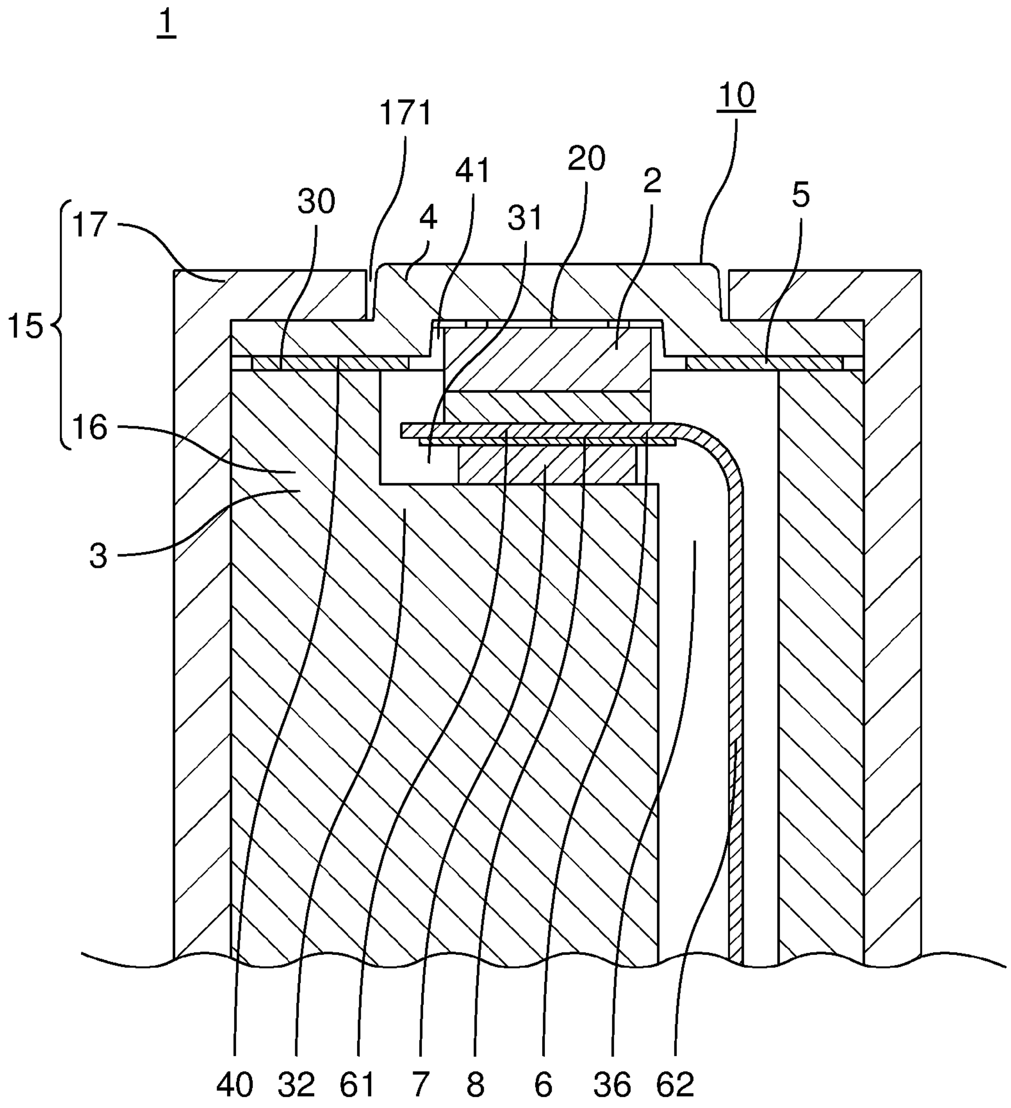
FIG. 4 is a cross-sectional view taken along line X-X in FIG. 3.
Figure 5:
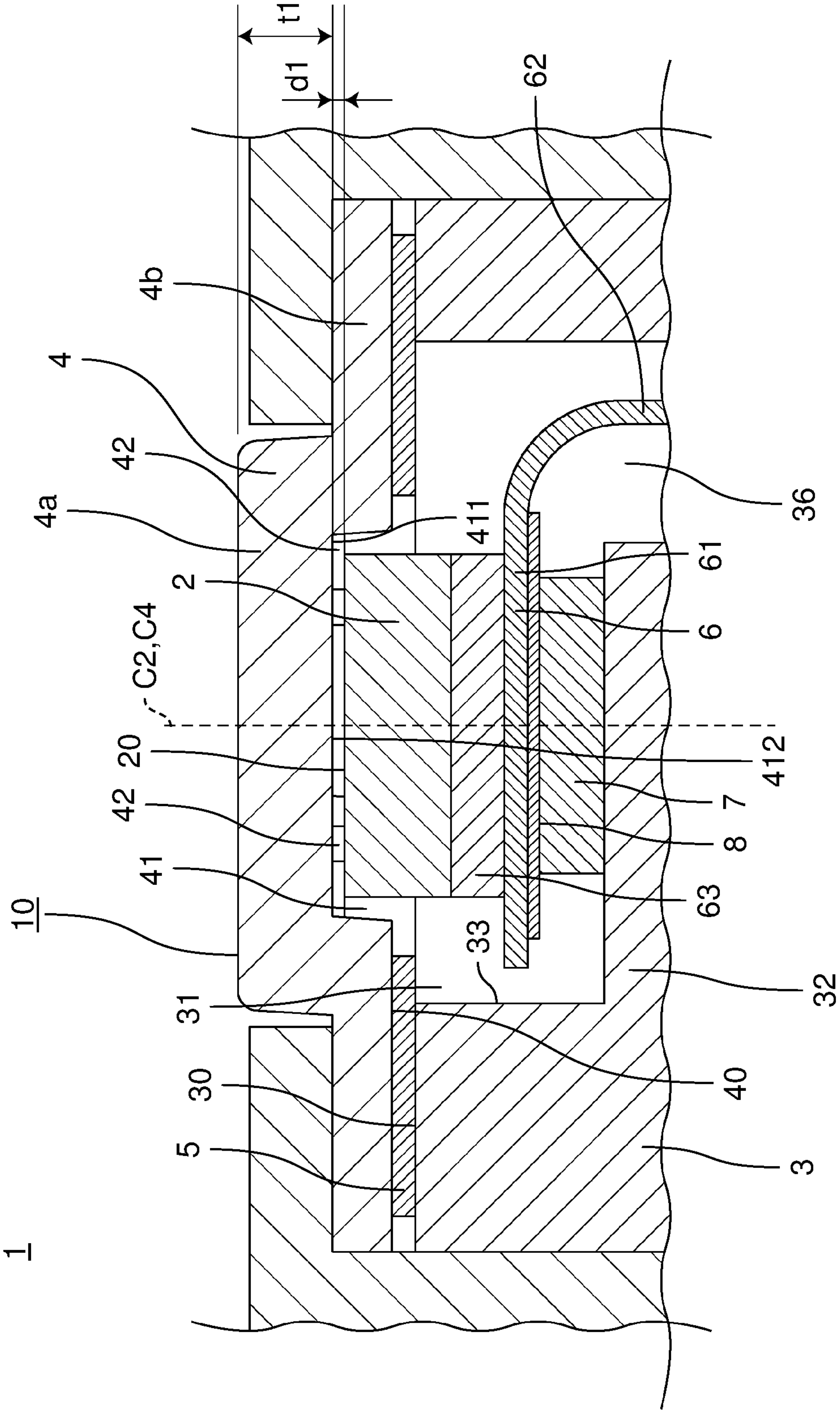
FIG. 5 is a partially enlarged view of FIG. 4.
Figure 6:
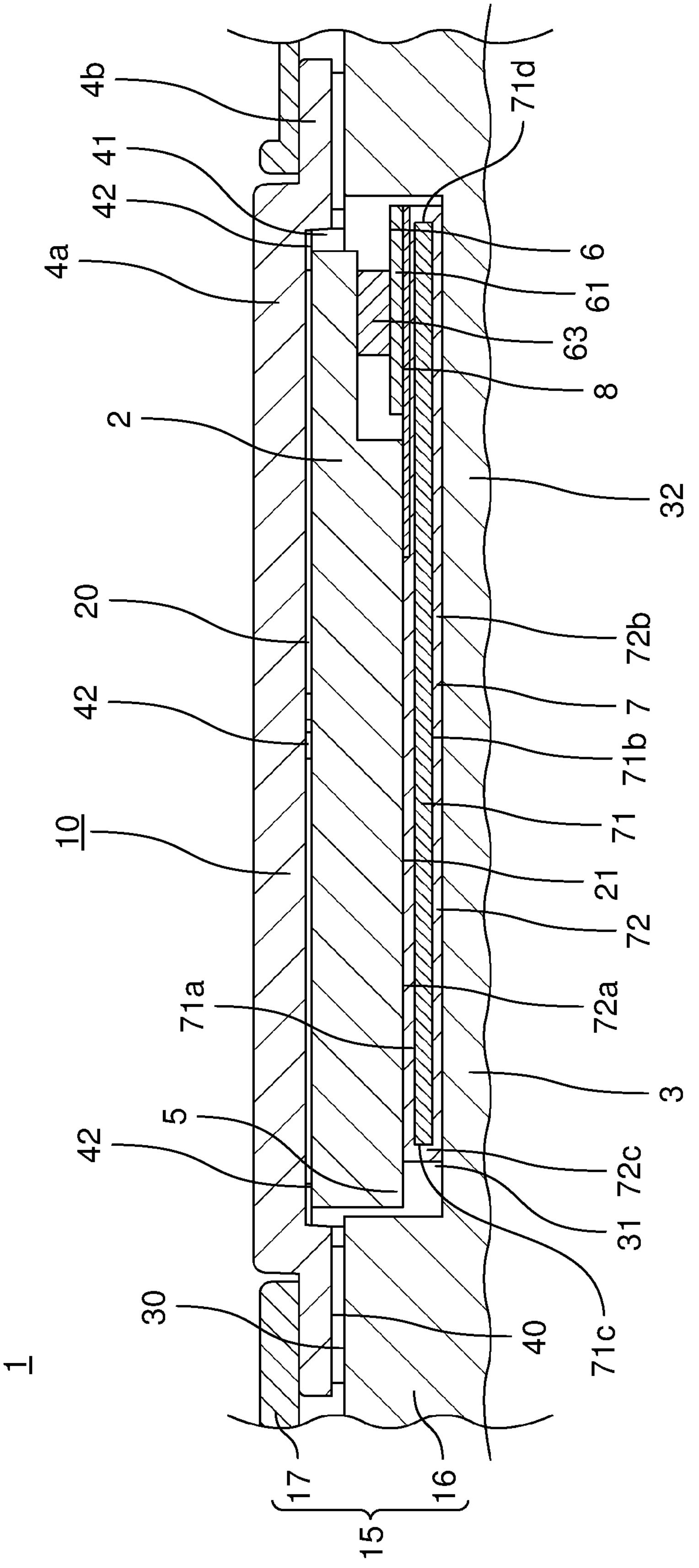
FIG. 6 is a cross-sectional view taken along line Y-Y in FIG. 3.

FIG. 4 is a cross-sectional view taken along line X-X in FIG. 3. FIG. 5 is a partially enlarged view of FIG. 4. FIG. 6 is a cross-sectional view taken along line Y-Y in FIG. 3.

As illustrated in FIGS. 4 to 6, antenna device 10 includes antenna module 2 for performing communication at a predetermined communication frequency, base 3 having conductivity, radome 4 which is a dielectric, and waterproof structure 5. Base 3 has first surface 30, and first recess 31 that can accommodate antenna module 2 is formed in first surface 30. That is, first recess 31 accommodates antenna module 2 and is formed in first surface 30 of base 3. Radome 4 has second surface 40 facing first surface 30 of base 3, and second recess 41 facing first recess 31 is formed in second surface 40. That is, second recess 41 faces first recess 31 and is formed in second surface 40 of radome 4. Waterproof structure 5 is a structure for waterproofing a space between first surface 30 of base 3 and second surface 40 of radome 4. That is, waterproof structure 5 is disposed between first surface 30 of base 3 and second surface 40 of radome 4 and is configured to waterproof antenna module 2. Antenna module 2 is accommodated in first recess 31 such that antenna surface 20 on which one or a plurality of antenna elements **2*a* are formed protrudes from first surface 30 into second recess 41. That is, antenna module 2 is accommodated in first recess 31 such that antenna surface 20 protrudes from first surface 30 into second recess 41**.

In antenna device 10, an accommodation space for antenna module 2 is formed by first recess 31 in first surface 30 of base 3 and second recess 41 in second surface 40 of radome 4. The accommodation space for antenna module 2 is waterproofed by waterproof structure 5. The waterproofing performance of waterproof structure 5 can be easily improved by enlarging a waterproofing region between first surface 30 of base 3 and second surface 40 of radome 4. Further, antenna module 2 is accommodated in first recess 31 such that antenna surface 20 on which antenna element **2*a* is formed protrudes from first surface 30 into second recess 41. In this manner, a radio wave that radiates from antenna element 2*a* of antenna surface 20 and travels toward a side opposite to antenna surface 20 can be reflected from first surface 30 of base 3 toward antenna surface 20. In this manner, the utilization efficiency of the radio wave radiating from antenna module 2 can be improved. Hence, according to antenna device 10 described above, the waterproofing performance and the antenna performance can be improved. In particular, the antenna device described in PTL 1 aims for environmental resistance, and improvement in antenna performance is not sufficient. In particular, PTL 1 does not improve antenna characteristics such as antenna gain or radiation directivity when an antenna is disposed in a body accommodating portion. In contrast, in antenna device 10** of the exemplary embodiment, as described above, the waterproofing performance and the antenna performance can be improved.

[1.2 Details]

Hereinafter, antenna device 10 and electronic equipment 1 including antenna device 10 will be further described.

[1.2.1 Electronic Equipment]

As illustrated in FIG. 1, electronic equipment 1 includes antenna device 10, communication circuit 11, input/output device 12, storage device 13, and arithmetic circuit 14. As illustrated in FIG. 2, electronic equipment 1 includes housing 15 that accommodates antenna device 10, communication circuit 11, input/output device 12, storage device 13, and arithmetic circuit 14.

Antenna device 10 is used for wireless communication between electronic equipment 1 and an external device. Antenna device 10 will be described in detail in "[1.2.2 Antenna Device]" to be provided below.

Communication circuit 11 is connected to antenna device 10. Communication circuit 11 is communicatively connected to an external device or system via antenna device 10. Communication circuit 11 includes one or more communication interfaces. Communication circuit 11 conforms to a predetermined communication protocol. The predetermined communication protocol can be selected from a variety of well-known wired and wireless communication standards.

Input/output device 12 functions as an input device for inputting information from a user and an output device for outputting information to the user. That is, input/output device 12 is used to input information to electronic equipment 1 and output information from electronic equipment 1. Input/output device 12 includes one or more human-machine interfaces. Examples of the human-machine interfaces include an input device such as a keyboard, a pointing device (mouse, track ball, etc.), or a touch pad, an output device such as a display or a speaker, and an input/output device such as a touch panel. In FIG. 2, input/output device 12 includes touch panel display 121. Touch panel display 121 is accommodated in housing 15 such that an operation surface and a display surface are exposed from housing 15.

Storage device 13 is used to store information used by arithmetic circuit 14 and information generated by arithmetic circuit 14. Storage device 13 includes one or more storages (non-transitory storage media). The storage may be, for example, any one of a hard disk drive (HDD), an optical drive, or a solid state drive (SSD).

Arithmetic circuit 14 is a circuit that controls an operation of electronic equipment 1. Arithmetic circuit 14 is connected to communication circuit 11 and input/output device 12 and can access storage device 13. Arithmetic circuit 14 can be implemented by, for example, a computer system including one or more processors (microprocessors) and one or more memories. One or more processors execute a program (stored in one or more memories or storage devices 13) to implement a predetermined function. In this example, the program is recorded in advance in storage device 13. Alternatively, the program may be provided via a telecommunication line such as the Internet or by being recorded in a non-transitory recording medium such as a memory card.

Housing 15 is configured to include metal housing 16 and outer frame 17. Metal housing 16 has a flat rectangular parallelepiped shape. Metal housing 16 accommodates communication circuit 11, input/output device 12, storage device 13, and arithmetic circuit 14. Outer frame 17 has a flat rectangular parallelepiped shape, similarly to metal housing 16. Outer frame 17 accommodates metal housing 16 therein. In housing 15, as illustrated in FIG. 4, antenna device 10 is accommodated between metal housing 16 and outer frame 17. In FIG. 4, antenna device 10 is located between a side surface of metal housing 16 and a side surface of outer frame 17 to be located on a side surface of housing 15. As illustrated in FIGS. 3 and 4, outer frame 17 has opening 171 from which antenna device 10 is exposed in order to allow a radio wave to pass from antenna device 10 or a radio wave to pass to antenna device 10. Outer frame 17 is made of metal or resin.

[1.2.2 Antenna Device]

Next, antenna device 10 will be described in detail. As illustrated in FIGS. 2 and 3, antenna device 10 is accommodated in housing 15 to be partially exposed from a side surface of housing 15.

As illustrated in FIG. 4, antenna device 10 includes antenna module 2, base 3, radome 4, waterproof structure 5, connection member 6, and elastic member 7.

Figure 7:
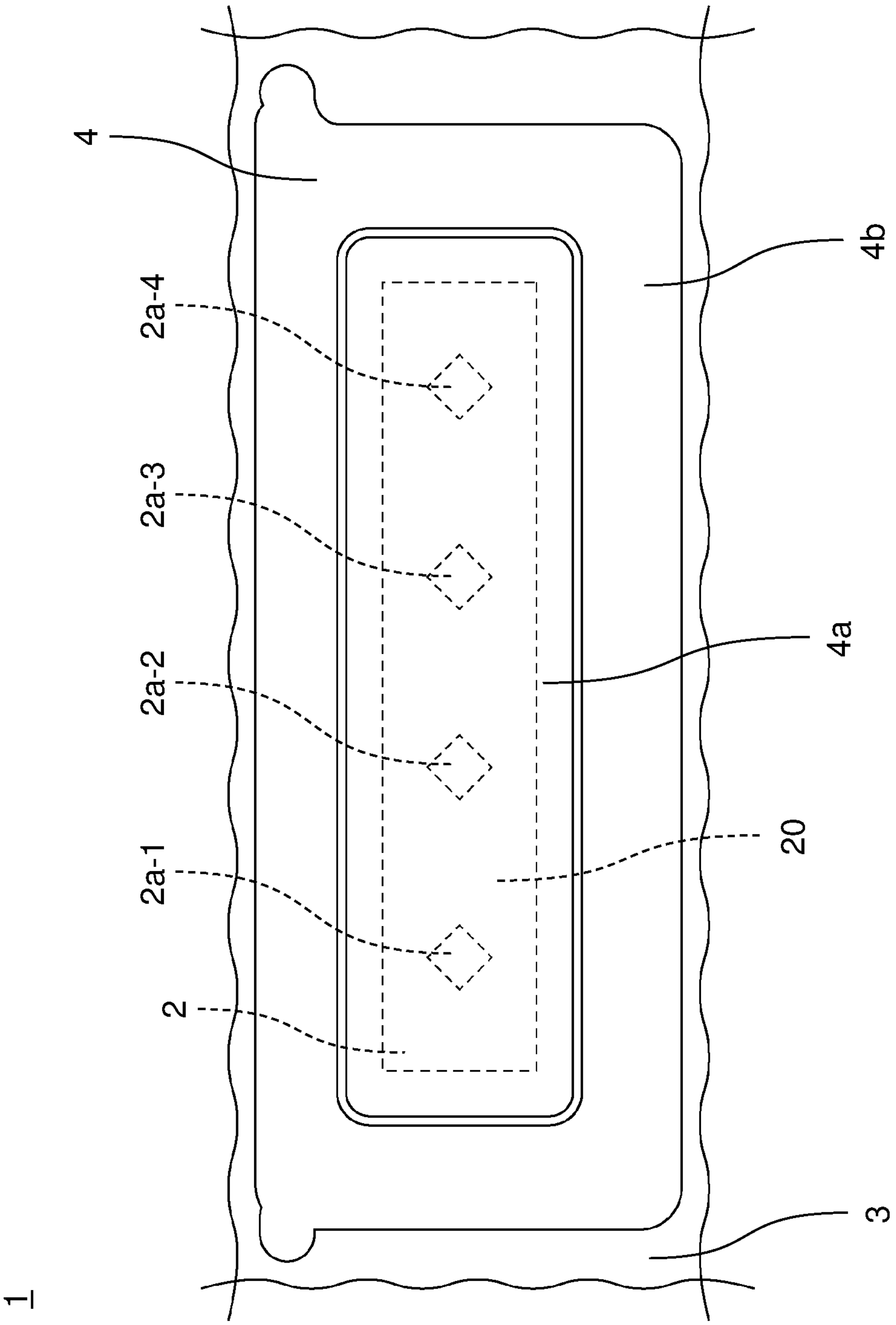
FIG. 7 is a plan view of the antenna device of the electronic equipment in FIG. 1.
Figure 8:
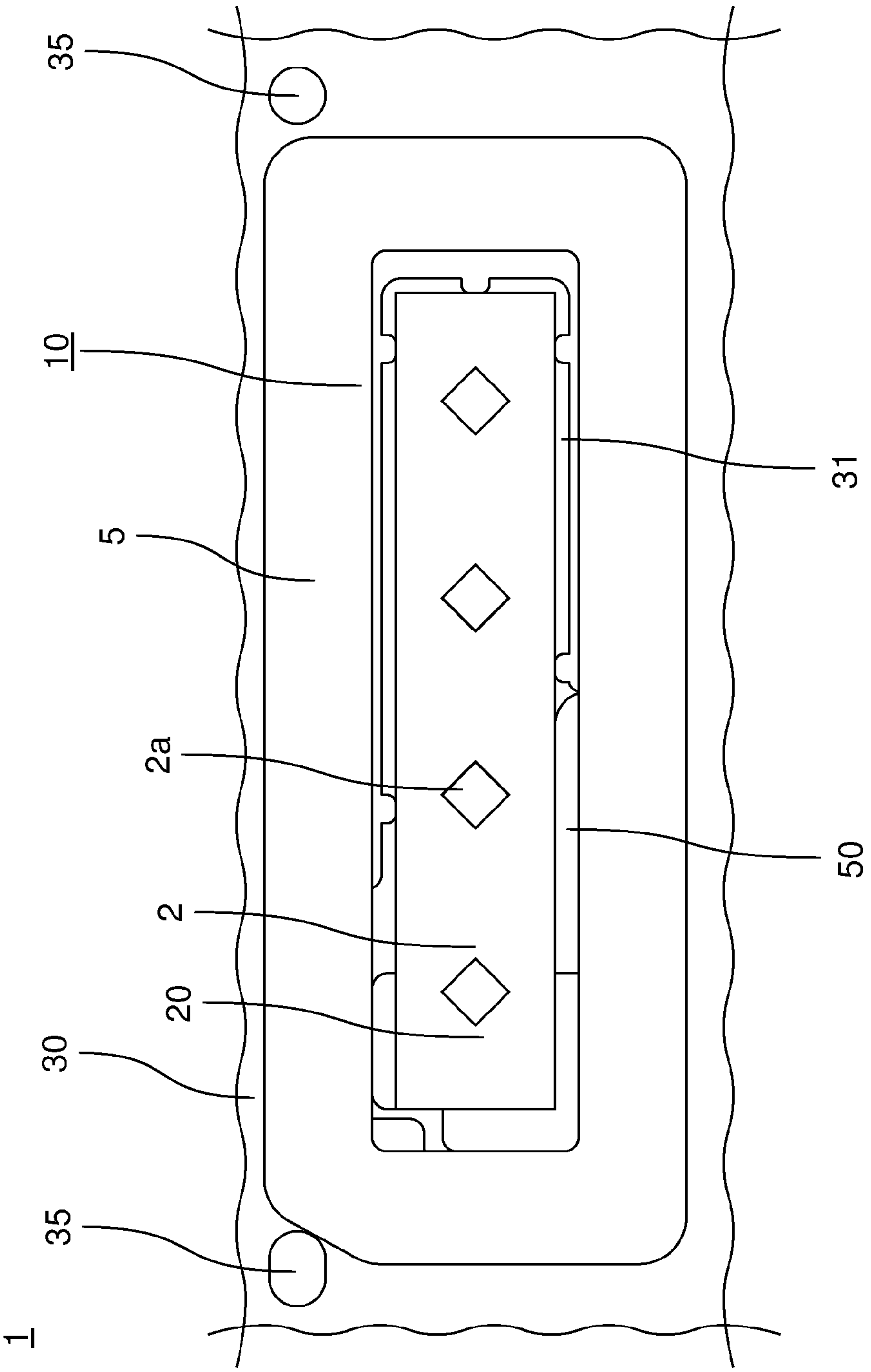
FIG. 8 is a plan view of the antenna device in FIG. 7 without a radome.
Figure 9:
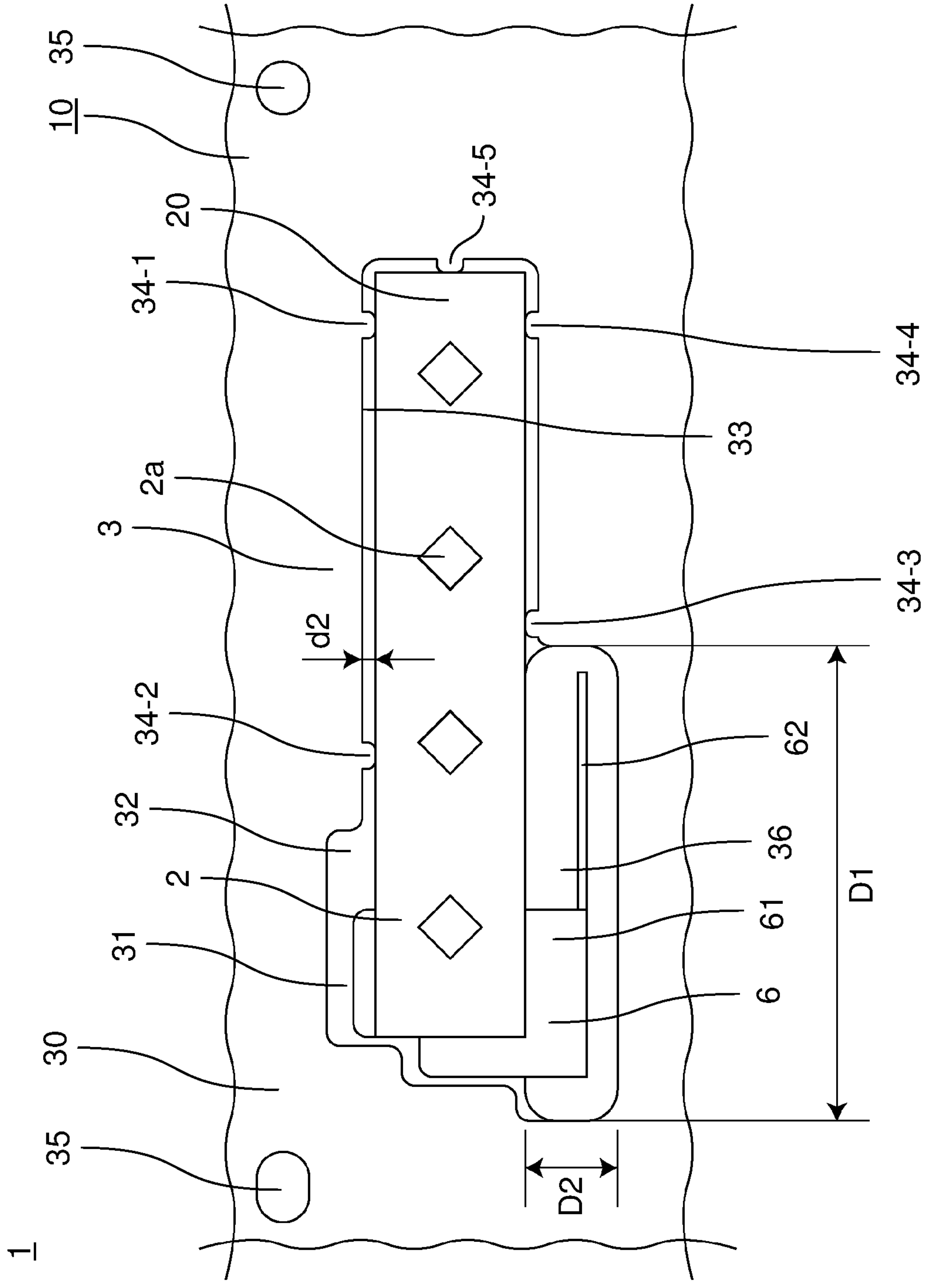
FIG. 9 is a plan view of the antenna device in FIG. 8 without a waterproof structure.
Figure 10:
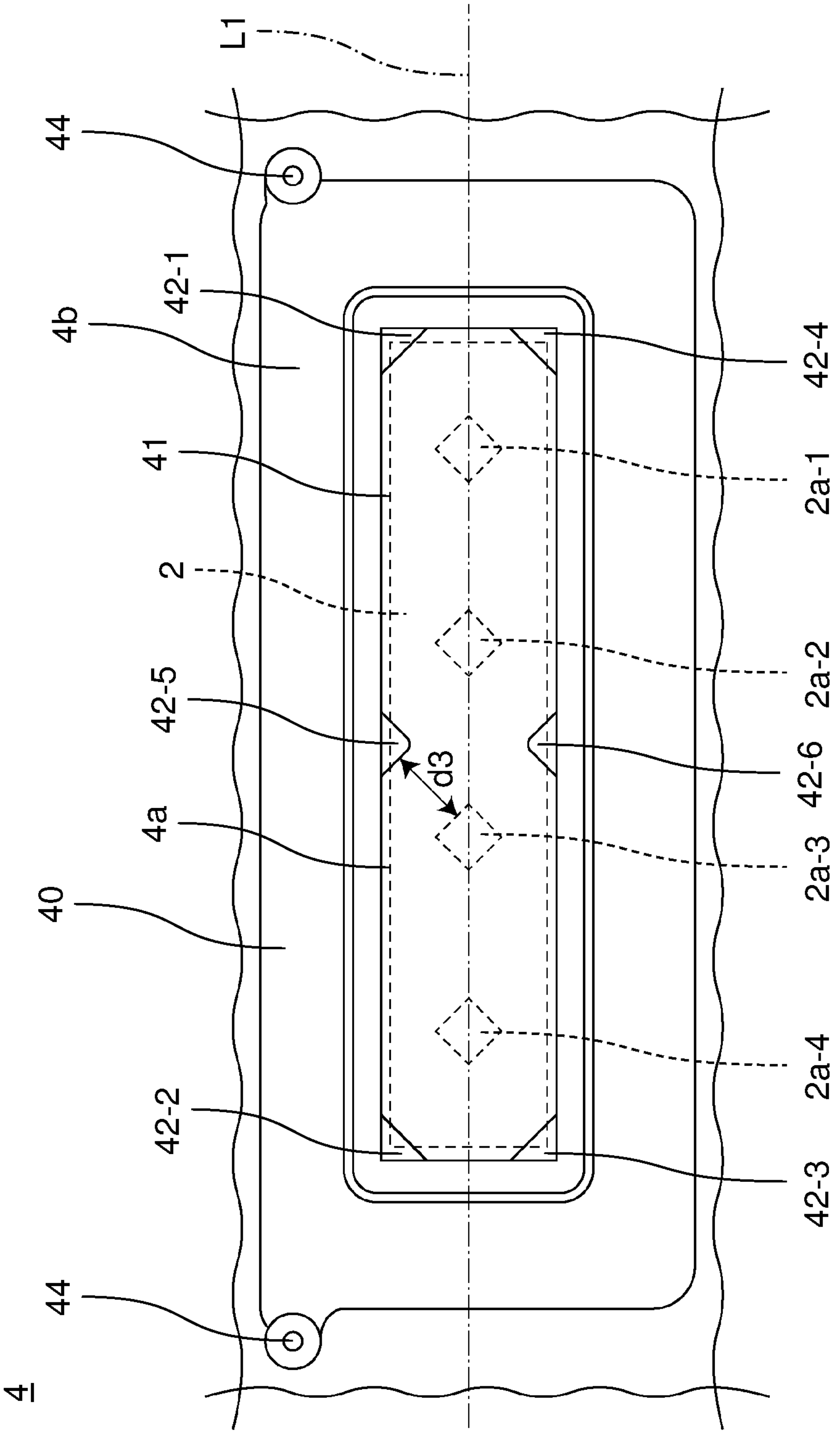
FIG. 10 is a bottom view of the radome of the antenna device in FIG. 7.
Figure 11:
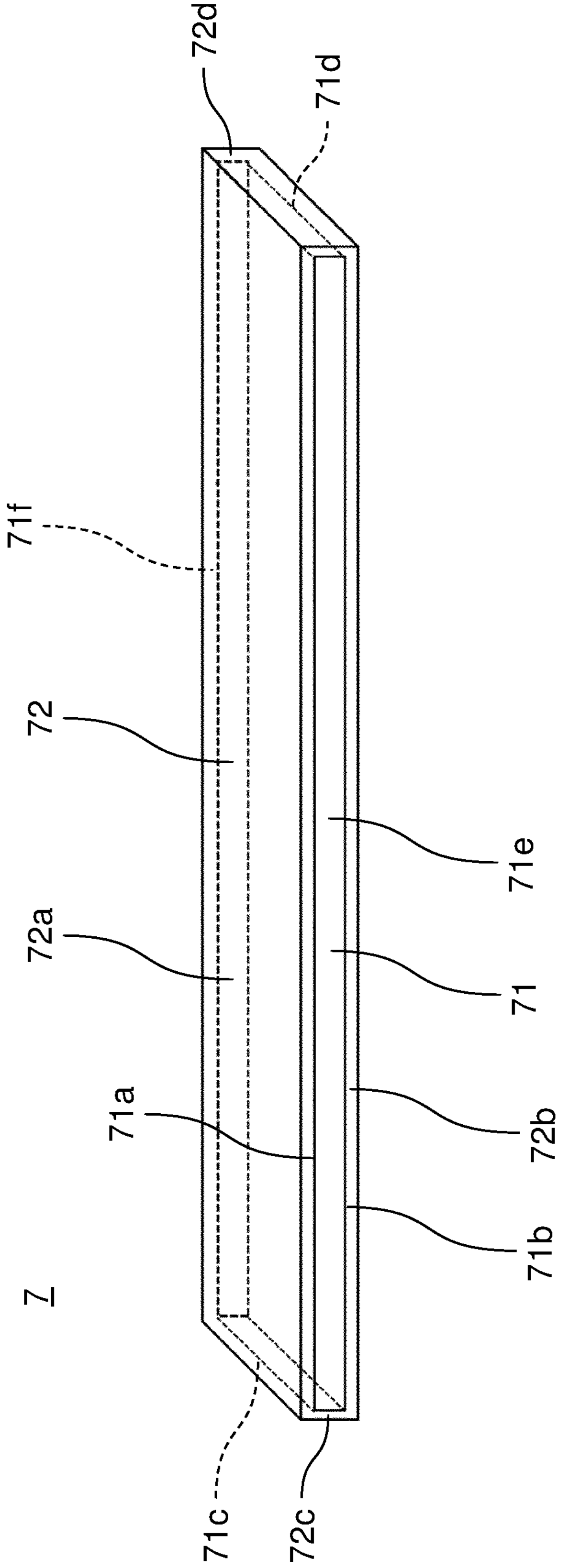
FIG. 11 is a perspective view of an elastic member of the antenna device in FIG. 7.

Further, the following description is provided with reference to FIGS. 7 to 11. FIG. 7 is a plan view of antenna device 10. FIG. 8 is a plan view of antenna device 10 without radome 4. FIG. 9 is a plan view of antenna device 10 without waterproof structure 5. FIG. 10 is a bottom view of radome 4 of antenna device 10. FIG. 11 is a perspective view of elastic member 7 of antenna device 10.

Antenna module 2 is used for performing communication at a predetermined communication frequency. Antenna module 2 is used to transmit and receive radio waves having a predetermined communication frequency. In the present exemplary embodiment, the predetermined communication frequency is included in a frequency bandwidth of 26 GHz to 300 GHz. The predetermined communication frequency is, for example, a frequency of a 28 GHz bandwidth or a 40 GHz bandwidth. Hence, antenna module 2 is an antenna module of a quasi-millimeter wave band to a millimeter wave band.

Antenna module 2 illustrated in FIGS. 4 to 9 has a rectangular plate shape. Antenna module 2 has a thickness direction (vertical direction in FIGS. 4 to 6), a length direction (horizontal direction in FIGS. 7 to 9), and a width direction (vertical direction in FIGS. 7 to 9). As illustrated in FIG. 6, antenna module 2 has antenna surface 20 and a ground surface 21 on both respective surfaces in the thickness direction. As illustrated in FIGS. 7 to 9, a plurality of antenna elements 2*a*-1 to 2*a*-4 (hereinafter, collectively denoted by reference mark 2*a*) are formed on antenna surface 20. Antenna element 2*a* is, for example, an electrode that is formed on antenna surface 20 and resonates at a predetermined communication frequency. In the exemplary embodiment, the plurality of antenna elements 2*a* are arranged on a straight line. Consequently, antenna module 2 can be used as a phased array antenna. Antenna elements 2*a*-1 to 2*a*-4 are arranged on antenna surface 20 along the length direction of antenna module 2. In the exemplary embodiment, the length direction of antenna module 2 is a direction in which antenna elements 2*a* (antenna elements 2*a*-1 to 2*a*-4) are arranged on antenna surface 20. The width direction of antenna module 2 is a direction orthogonal to both of the thickness direction of antenna module 2 and the direction in which antenna elements 2*a* are arranged on antenna surface 20 (length direction of antenna module 2). A ground pattern is formed on the ground surface. The ground pattern functions as a reflection plate.

Base 3 accommodates antenna module 2. As illustrated in FIGS. 4 to 6, base 3 has first surface 30. Base 3 has conductivity. Base 3 is made of a conductive material such as a metal material. In the exemplary embodiment, as illustrated in FIG. 4, base 3 is a part of metal housing 16. Specifically, base 3 is configured using a side portion of metal housing 16. First surface 30 of base 3 is an outer surface of metal housing 16. The outer surface of metal housing 16 is a surface of metal housing 16 on outer frame 17 side and is a surface on an opposite side to communication circuit 11 and the like accommodated in metal housing 16. In base 3, first recess 31 that can accommodate antenna module 2 is formed in first surface 30. As illustrated in FIG. 9, first recess 31 has a substantially rectangular shape in plan view. First recess 31 is configured to include bottom 32 on which antenna module 2 is placed and inner surface 33 surrounding antenna module 2. Bottom 32 and inner surface 33 of first recess 31 serve as reflection plates that reflect radio waves radiating from antenna module 2 in a front direction (toward antenna surface 20) of antenna module 2, and the utilization efficiency of the radio wave radiating from antenna module 2 can be improved.

Antenna module 2 is disposed at a designated position in first recess 31. The designated position is a position where distance d2 between antenna module 2 and inner surface 33 is longer than 0 and shorter than or equal to 1/10 of a wavelength corresponding to the predetermined communication frequency, on at least a part of inner surface 33 of first recess 31. In FIG. 9, at a part of a first end and a second end (upper end and a lower end in FIG. 9) in the width direction and the first end (right end in FIG. 9) in the length direction of antenna module 2, distance d2 is longer than 0 and shorter than or equal to 1/10 of the wavelength corresponding to the predetermined communication frequency. As will be described in detail in "[1.4 Evaluation]" to be provided below, antenna module 2 is disposed at the designated position, and thereby a gain of antenna module 2 in the front direction (toward antenna surface 20) can be improved.

As illustrated in FIG. 9, base 3 has a plurality of positioning protrusions 34-1 to 34-5 (hereinafter, collectively denoted by reference mark 34) that position antenna module 2 at the designated position by coming into contact with antenna module 2. In this manner, since antenna module 2 and base 3 are easily aligned, assembly work of antenna device 10 can be easily performed. The plurality of positioning protrusions 34 protrude from inner surface 33 of first recess 31. In this manner, a structure of base 3 can be simplified. In the exemplary embodiment, a protruding amount of positioning protrusion 34 from inner surface 33 is set to be larger than 0 and less than or equal to 1/10 of the wavelength corresponding to the predetermined communication frequency.

More specifically, positioning protrusions 34-1 and 34-2 protrude from a portion of inner surface 33 of first recess 31 facing the first end (upper end in FIG. 9) in the width direction of antenna module 2, and thereby distance d2 between antenna module 2 and the portion of inner surface 33 facing the first end in the width direction of antenna module 2 is set to be longer than 0 and shorter than or equal to 1/10 of the wavelength corresponding to the predetermined communication frequency. Positioning protrusions 34-3 and 34-4 protrude from a portion of inner surface 33 of first recess 31 facing the second end (the lower end in FIG. 9) in the width direction of antenna module 2, and thereby distance d2 between antenna module 2 and the portion of inner surface 33 facing the second end in the width direction of antenna module 2 is set to be longer than 0 and shorter than or equal to 1/10 of the wavelength corresponding to the predetermined communication frequency. Distance d2 may be shorter than or equal to 1/18 of the wavelength corresponding to the predetermined communication frequency or may be shorter than or equal to 1/27 of the wavelength corresponding to the predetermined communication frequency. For example, in a case where the predetermined communication frequency is a frequency of the 28 GHz band, distance d2 may be about 0.4 mm which is 1/27 of the wavelength corresponding to the predetermined communication frequency. For example, in a case where the predetermined communication frequency is a frequency of the 40 GHz band, distance d2 may be about 0.4 mm which is 1/18 of the wavelength corresponding to the predetermined communication frequency. Antenna module 2 is positioned in the width direction of antenna module 2 by positioning protrusions 34-1, 34-2, 34-3, and 34-4. Positioning protrusion 34-5 protrudes from a portion of inner surface 33 of first recess 31 facing the first end (the right end in FIG. 9) in the length direction of antenna module 2, and thereby distance d2 between antenna module 2 and the portion of inner surface 33 facing the first end in the length direction of antenna module 2 is set to be longer than 0 and shorter than or equal to 1/10 of the wavelength corresponding to the predetermined communication frequency. In FIG. 9, a corner of the second end (left end in FIG. 9) in the length direction of antenna module 2 comes into contact with inner surface 33 of first recess 31. In this manner, antenna module 2 is positioned in the length direction of antenna module 2.

As illustrated in FIG. 9, base 3 includes a positioning portion 35. In the exemplary embodiment, base 3 has two positioning portions 35. Positioning portions 35 position radome 4 at a predetermined position. As illustrated in FIG. 5, the predetermined position is a position where center C4 of radome 4 and center C2 of antenna module 2 coincide with each other in a direction (right-left direction in FIG. 5, the width direction of antenna module 2) orthogonal to both of the thickness direction of antenna module 2 and the direction in which antenna elements 2*a* are arranged on antenna surface 20. That is, in such a structure, when radome 4 is attached to base 3, center C4 of radome 4 fits within center C2 of antenna module 2 in the width direction. Radome 4 is disposed at the predetermined position, and thereby an influence of radome 4 on the antenna radiation characteristics of antenna module 2 can be reduced. In addition, since positioning portion 35 facilitates alignment between radome 4 and antenna module 2, assembly work of antenna device 10 can be facilitated. In the exemplary embodiment, positioning portion 35 is coupled with positioning portion 44 (see FIG. 10) of radome 4 to be described below, thereby positioning radome 4 at the predetermined position. In FIG. 9, positioning portion 35 is a recess that receives positioning portion 44 of radome 4. Positioning portions 35 are formed around first recess 31 in first surface 30 of base 3.

As illustrated in FIG. 9, base 3 has opening 36. As illustrated in FIGS. 4 and 5, opening 36 penetrates bottom 32 of first recess 31. As described above, base 3 is a part of metal housing 16, and opening 36 connects the inside and the outside of metal housing 16. Opening 36 enables antenna module 2 disposed outside metal housing 16 to be connected to communication circuit 11 inside metal housing 16. As illustrated in FIG. 9, opening 36 does not overlap antenna module 2 in the thickness direction of antenna module 2. As described above, bottom 32 of first recess 31 serves as a reflection plate that reflects the radio wave radiating from antenna module 2 in a front direction (toward antenna surface 20) of antenna module 2. Therefore, by preventing opening 36 from overlapping antenna module 2 in the thickness direction of antenna module 2, antenna module 2 can be connected to a separate electric circuit (communication circuit 11) while an influence of opening 36 on the radiation characteristics of antenna module 2 is reduced.

As illustrated in FIG. 9, opening 36 has a substantially rectangular shape in plan view. A length direction and a width direction of opening 36 correspond to the length direction and the width direction of antenna module 2. Opening 36 is adjacent to antenna module 2 in a direction (width direction of antenna module 2) orthogonal to both of the thickness direction of antenna module 2 and the direction in which antenna elements 2*a* are arranged on antenna surface 20 (length direction of antenna module 2). According to this configuration, a wiring length suitable for connection of antenna module 2 to the separate electric circuit (communication circuit 11) can be shortened.

The dimensions of opening 36 are further described. In the exemplary embodiment, in the direction in which antenna elements 2*a* are arranged on antenna surface 20 (length direction of antenna module 2), dimension D1 of opening 36 is less than or equal to ½ of a dimension of antenna module 2. As will be described in detail in "[1.4 Evaluation]" to be provided below, according to this configuration, antenna module 2 can be connected to the separate electric circuit (communication circuit 11) while the influence of opening 36 on the radiation characteristics of antenna module 2 is reduced. In the exemplary embodiment, dimension D2 of opening 36 is less than or equal to ⅓ of the wavelength corresponding to the predetermined communication frequency in the direction (width direction of antenna module 2) orthogonal to both of the thickness direction of antenna module 2 and the direction in which antenna elements 2*a* are arranged on antenna surface 20. In this manner, antenna module 2 can be connected to the separate electric circuit (communication circuit 11) while an influence of opening 36 on the radiation characteristics of antenna module 2 is reduced.

As illustrated in FIG. 6, antenna module 2 is accommodated in first recess 31 of first surface 30 of base 3, and elastic member 7 is disposed between antenna module 2 and bottom 32 of first recess 31 of base 3. A depth of first recess 31 is smaller than a thickness of antenna module 2 and a thickness of elastic member 7. Therefore, antenna module 2 is accommodated in first recess 31 such that antenna surface 20 protrudes from first surface 30.

Radome 4 protects antenna module 2. Radome 4 is made of a dielectric material such as a resin material to transmit a radio wave from antenna module 2 or a radio wave to antenna module 2. As illustrated in FIGS. 4 to 6, radome 4 has second surface 40 facing first surface 30 of base 3. In radome 4, second recess 41 facing first recess 31 is formed in second surface 40. The second recess 41 forms a space together with first recess 31 to accommodate antenna module 2. As illustrated in FIGS. 7 and 10, radome 4 has a rectangular plate shape in plan view. A surface on base 3 side in a thickness direction of radome 4 is second surface 40. As illustrated in FIG. 10, radome 4 includes first portion 4*a* corresponding to a bottom of second recess 41 and second portion 4*b* corresponding to a side wall of second recess 41 and a flange protruding outward from the side wall. Thickness t1 of first portion 4*a* is uniform, and both surfaces of first portion 4*a* in the thickness direction are flat surfaces. Therefore, bottom surface 411 of second recess 41 is also a flat surface. First portion 4*a* is line-symmetric with respect to a line passing through a center of radome 4 in a width direction along a length direction of radome 4. The thickness of second portion 4*b* is uniform, and both surfaces of second portion 4*b* in the thickness direction are flat surfaces.

In the exemplary embodiment, as illustrated in FIG. 5, antenna module 2 is accommodated in first recess 31 such that antenna surface 20 protrudes from first surface 30. When radome 4 is attached to base 3, antenna surface 20 of antenna module 2 is positioned in second recess 41 of radome 4. Bottom surface 411 of second recess 41 is a flat surface. Consequently, bottom surface 411 of second recess 41 of radome 4 includes facing region 412 facing antenna surface 20 and parallel thereto. Distance d1 between facing region 412 and antenna surface 20 is within a range from 1/50 to 1/30, inclusive, of a wavelength corresponding to a predetermined communication frequency. For example, in a case where the predetermined communication frequency is a frequency of the 28 GHz band, distance d1 is within a range from about 0.2 mm to 0.35 mm. For example, in a case where the predetermined communication frequency is a frequency of the 40 GHz band, distance d1 is within a range from about 0.15 mm to 0.25 mm. It has been confirmed by tests that antenna gain significantly decreases when distance d1 exceeds 1/30 of a wavelength corresponding to a predetermined communication frequency. Hence, distance d1 between facing region 412 and antenna surface 20 is within the range from 1/50 to 1/30 of the wavelength corresponding to the predetermined communication frequency, and thereby it is possible to suppress a decrease in antenna gain due to reflection of a radio wave from radome 4.

As illustrated in FIG. 10, radome 4 includes spacers 42-1 to 42-6 (hereinafter, collectively denoted by reference mark 42) in order to set distance d1 within a range from 1/50 to 1/30, inclusive, of a wavelength corresponding to a predetermined communication frequency. As illustrated in FIG. 5, spacers 42 are arranged between facing region 412 and antenna surface 20 and maintain distance d1 between facing region 412 and antenna surface 20 within a range from 1/50 to 1/30, inclusive, of the wavelength corresponding to the predetermined communication frequency. In the exemplary embodiment, spacers 42 are formed on bottom surface 411 of second recess 41. Spacer 42 is continuously and integrally formed with first portion 4*a* and second portion 4*b*, and spacer 42 is also a dielectric. A height of spacer 42 is set to have distance d1 from 1/50 to 1/30, inclusive, of the wavelength corresponding to the predetermined communication frequency in a state where antenna surface 20 is in contact with spacer 42. Therefore, it is easy to set distance d1 within the range from 1/50 to 1/30, inclusive, of the wavelength corresponding to the predetermined communication frequency.

As illustrated in FIG. 10, spacers 42 are arranged not to face antenna elements 2*a* of antenna module 2 (in the thickness direction of antenna module 2). Further, distance d3 between spacer 42 and antenna element 2*a* (In FIG. 10, illustrated as a distance between spacer 42-5 and antenna element 2*a*-3) in a plane parallel to antenna surface 20 is set to be longer than or equal to 1/5 of a wavelength corresponding to a predetermined communication frequency. More specifically, a distance between spacer 42-5 and each of antenna elements 2*a*-1 to 2*a*-4 is set to be longer than or equal to 1/5 of a wavelength corresponding to a predetermined communication frequency. Distance d3 may be shorter than or equal to 1/8 of the wavelength corresponding to the predetermined communication frequency. In the exemplary embodiment, spacers 42-1 to 42-6 are arranged around bottom surface 411 of second recess 41. Each of spacers 42-1 to 42-6 is separated from antenna element 2*a* closest to a corresponding spacer, of antenna elements 2*a*-1 to 2*a*-4, in a plane parallel to antenna surface 20 by distance d3 within a range from 1/5 to 1/8, inclusive, of the wavelength corresponding to the predetermined communication frequency. For example, in a case where the predetermined communication frequency is the frequency of the 28 GHz band, distance d3 is within a range from about 1.3 mm to 2.1 mm, inclusive. For example, in a case where the predetermined communication frequency is the frequency of the 40 GHz band, distance d3 is within a range from about 0.9 mm to 1.5 mm, inclusive. In the exemplary embodiment, spacer 42 is a dielectric. Therefore, setting of distance d3 to 1/5 or longer of the wavelength corresponding to the predetermined communication frequency enables the influence on the antenna characteristics such as the antenna gain and the radiation directivity due to spacers 42 to be reduced while distance d1 is maintained in the range from 1/50 to 1/30, inclusive, of the wavelength corresponding to the predetermined communication frequency.

As illustrated in FIG. 10, radome 4 includes positioning portions 44. Regarding positioning portion 44, radome 4 has two positioning portions 44 in the exemplary embodiment. The positioning portion 44 is used with positioning portion 35 of base 3 to position radome 4 at the predetermined position described above. In FIG. 10, positioning portion 44 is a projecting portion fitted into positioning portion 35 of base 3. Positioning portions 44 are formed at an edge of second portion 4*b* of radome 4. As illustrated in FIG. 5, the predetermined position is a position where center C4 of radome 4 and center C2 of antenna module 2 coincide with each other in a direction (right-left direction in FIG. 5, the width direction of antenna module 2) orthogonal to both of the thickness direction of antenna module 2 and the direction in which antenna elements 2*a* are arranged on antenna surface 20. As described above, first portion 4*a* of radome 4 is line-symmetric with respect to a line passing through the center of radome 4 in the width direction along the length direction of radome 4. Therefore, radome 4 is positioned at the predetermined position such that first portion 4*a* is line-symmetric with respect to line L1 passing through centers of antenna elements 2*a* (antenna elements 2*a*-1 to 2*a*-4) arranged in one direction on antenna surface 20. First portion 4*a* is a portion covering antenna module 2 in radome 4. Accordingly, in radome 4, the portion (first portion 4*a*) covering antenna module 2 in radome 4 is line-symmetric with respect to line L1 passing through the centers of antenna elements 2*a* arranged in one direction on antenna surface 20. That is, radome 4 has a recess structure that is substantially line-symmetric with respect to a short-side direction of antenna module 2. According to this configuration, it is possible to reduce a possibility that the radiation characteristics of antenna module 2 will be disturbed by radome 4 and the radiation will become strong or weak in an unintended direction. As a result, the antenna gain of antenna module 2 in the front direction (toward antenna surface 20) can be improved.

As described above, in radome 4, thickness t1 of first portion 4*a* is uniform, and both surfaces of first portion 4*a* in the thickness direction are flat surfaces. Thickness t1 of first portion 4*a* is within a range from 1/10 to 1/8, inclusive, of the wavelength corresponding to the predetermined communication frequency. That is, in radome 4, since first portion 4*a* is a facing portion facing antenna surface 20, thickness t1 of the facing portion is in a range from 1/10 to 1/8, inclusive, of the wavelength corresponding to the predetermined communication frequency. For example, in the case where the predetermined communication frequency is the frequency of the 28 GHz band, thickness t1 is within a range from about 1.1 mm to 1.3 mm, inclusive. For example, in the case where the predetermined communication frequency is the frequency of the 40 GHz band, thickness t1 is within a range from about 0.8 mm to 0.9 mm, inclusive. According to this configuration, it is possible to reduce a possibility that the radiation characteristics of antenna module 2 will be disturbed by radome 4 and the radiation will become strong or weak in an unintended direction. As a result, the antenna gain of antenna module 2 in the front direction (toward antenna surface 20) can be improved.

Waterproof structure 5 is a structure for waterproofing a space between first surface 30 of base 3 and second surface 40 of radome 4. In the exemplary embodiment, waterproof structure 5 is positioned between a circumferential edge of first recess 31 in first surface 30 of base 3 and a circumferential edge of second recess 41 of second surface 40 of radome 4. In particular, waterproof structure 5 is a joining member that joins radome 4 to base 3 by filling a gap between first surface 30 of base 3 and second surface 40 of radome 4. The joining member is, for example, a cushioning double-sided tape having waterproofness. As illustrated in FIG. 8, waterproof structure 5 has a rectangular frame shape having opening 50. Alternatively, waterproof structure 5 may be an elastic member having waterproofness. Waterproof structure 5 can be configured to fill the gap between first surface 30 of base 3 and second surface 40 of radome 4, and waterproof structure 5 can be configured to be sandwiched between radome 4 and base 3 by screw-fastening or the like of radome 4. Waterproof structure 5 is disposed on first surface 30 of base 3 such that antenna module 2 in first recess 31 is exposed from opening 50.

Connection member 6 is used to connect antenna module 2 to communication circuit 11. As illustrated in FIG. 4, connection member 6 includes first piece 61 and second piece 62. First piece 61 is connected to antenna module 2 and extends from antenna module 2 toward opening 36 of first recess 31 of base 3. Second piece 62 extends from a tip of first piece 61 through opening 36. Second piece 62 is connected to communication circuit 11 in metal housing 16. Second piece 62 has a size to pass through opening 36. In the exemplary embodiment, after connection member 6 is connected to antenna module 2, second piece 62 is caused to pass through opening 36 such that antenna module 2 and connection member 6 can be accommodated in first recess 31. In this manner, the assembly work of antenna device 10 can be facilitated. In this case, in order to prevent antenna module 2 and connection member 6 from being unintentionally detached, first piece 61 of connection member 6 may be fixed to antenna module 2 with fixing tape 8 as illustrated in FIG. 6. Connection member 6 includes a wiring pattern extending from first piece 61 to second piece 62, and antenna module 2 connected to first piece 61 and communication circuit 11 connected to second piece 62 are connected to each other by the wiring pattern. Use of connection member 6 makes it unnecessary to perform an operation of connecting antenna module 2 and communication circuit 11 by a connection line or the like passing through opening 36. Accordingly, this facilitates connection of antenna module 2 and communication circuit 11. In the exemplary embodiment, connection member 6 includes connector 63. The connector 63 is provided at first piece 61 to facilitate connection between antenna module 2 and first piece 61. In the exemplary embodiment, first piece 61 and second piece 62 are formed by bending a flexible substrate. Consequently, connection member 6 can be easily provided. As described above, in connection member 6, the wiring pattern is configured to pass through the shortest path in order to minimize a line loss, and second piece 62 is smaller than opening 36. In this manner, the flexible substrate is configured to be bent at substantially a right angle from a connector end of antenna module 2 and drawn into metal housing 16. In addition, by providing a conductive reinforcing plate on a front surface of a flexible cable, conductivity at the time of surface contact can be improved.

Elastic member 7 is used to position antenna module 2 with respect to radome 4 in the thickness direction of antenna module 2. As illustrated in FIGS. 4 to 6, elastic member 7 is disposed between antenna module 2 and bottom 32 of first recess 31 of base 3. More specifically, elastic member 7 is disposed between antenna module 2 and bottom 32 of first recess 31 of base 3 in a compressed state in the thickness direction of antenna module 2. Elastic member 7 has elasticity to the extent that elastic member 7 can withstand a weight of antenna module 2 and can press antenna module 2 against radome 4. According to this configuration, elastic member 7 uniformly presses antenna module 2 against radome 4. Therefore, even if shape errors or thermal expansion and contraction of antenna module 2, base 3, radome 4, waterproof structure 5, connection member 6, and the like occur, antenna module 2 can be positioned at a predetermined position with respect to radome 4. In this manner, variations in performance of antenna device 10 due to variations in distance between antenna module 2 and radome 4 can be reduced, and a yield can be improved.

As illustrated in FIG. 11, elastic member 7 includes body 71 and conductive layer 72.

Body 71 has elasticity. Body 71 illustrated in FIG. 11 has a flat rectangular parallelepiped shape. A thickness direction, a length direction, and a width direction of body 71 correspond to the thickness direction, the length direction, and the width direction of antenna module 2, respectively. A front surface of body 71 includes first surface 71*a* and second surface 71*b* in the thickness direction of body 71, third surface 71*c* and fourth surface 71*d* in the length direction of body 71, and fifth surface 71*e* and sixth surface 71*f* in the width direction of body 71. First surface 71*a* of body 71 is a surface of body 71 facing antenna module 2. Second surface 71*b* of body 71 is a surface of body 71 on an opposite side to antenna module 2. Third surface 71*c* and fourth surface 71*d* of body 71 are both surfaces in the direction in which antenna elements 2*a* are arranged on antenna surface 20. Fifth surface 71*e* and sixth surface 71*f* of body 71 are both surfaces in the direction orthogonal to both of the thickness direction of antenna module 2 and the direction in which antenna elements 2*a* are arranged on antenna surface 20. Examples of materials of body 71 include a cushion material and a heat dissipation rubber material. The cushion material includes foamed polyurethane, foamed polyethylene, ethylene propylene rubber, and the like. The heat dissipation rubber material includes silicone, acryl, and the like. In the exemplary embodiment, body 71 is made of the heat dissipation rubber material. Accordingly, body 71 has thermal conductivity.

Conductive layer 72 connects ground surface 21 of antenna module 2 to base 3. It can be determined that conductive layer 72 connects ground surface 21 of antenna module 2 to base 3 in terms of high frequency. In this manner, base 3 can be used as a ground of antenna module 2. Therefore, an influence of sensitivity suppression due to unnecessary radiation from antenna module 2 can be reduced. In the exemplary embodiment, conductive layer 72 is made of a metal material and has thermal conductivity. The metal material of conductive layer 72 is preferably a material having relatively high thermal conductivity among the metal materials. Conductive layer 72 is formed on the front surface of body 71. More specifically, as illustrated in FIG. 11, conductive layer 72 includes first portion 72*a*, second portion 72*b*, and third portions 72*c* and 72*d*. First portion 72*a* covers first surface 71*a* of body 71. First portion 72*a* is located on first surface 71*a* of body 71 facing antenna module 2 and is connected to antenna module 2. Second portion 72*b* covers second surface 71*b* of body 71. Second portion 72*b* is located on second surface 71*b* of body 71 on an opposite side to antenna module 2 and is connected to base 3. Third portions 72*c* and 72*d* cover third surface 71*c* and fourth surface 71*d* of body 71, respectively. Third portions 72*c* and 72*d* connect first portion 72*a* and second portion 72*b*. Third portions 72*c* and 72*d* are located on both surfaces (third surface 71*c* and fourth surface 71*d*) of body 71 in the direction (the right-left direction in FIG. 11) in which antenna elements 2*a* are arranged on antenna surface 20, and third portions 72*c* and 72*d* connect first portion 72*a* and second portion 72*b*. In this manner, there is no portion covering fifth surface 71*e* and sixth surface 71*f* of body 71. Conductive layer 72 is formed by, for example, winding a conductive sheet around body 71 with the width direction of body 71 as a direction of a central axis. As will be described in detail in "[1.4 Evaluation]" to be provided below, in this manner, it is possible to reduce the influence of conductive layer 72 on the radiation characteristics of antenna module 2.

In the exemplary embodiment, since body 71 and conductive layer 72 have thermal conductivity, elastic member 7 has thermal conductivity as a whole. According to this configuration, heat generated in antenna module 2 can be transmitted to base 3 via elastic member 7, and heat dissipation of antenna device 10 can be improved.

According to elastic member 7 described above, the influence of sensitivity suppression due to unnecessary radiation from antenna module 2 can be reduced, an influence of conductive layer 72 on the radiation characteristics of antenna module 2 can be reduced, and further the heat dissipation of antenna device 10 can be improved.

[1.3. Assembly]

Next, an example of a method for assembling antenna device 10 will be briefly described.

First, connection member 6 is connected to antenna module 2. Specifically, antenna module 2 is connected to connector 63 of connection member 6, and first piece 61 of connection member 6 is fixed to antenna module 2 by fixing tape 8.

Next, elastic member 7 is disposed on bottom 32 of first recess 31 of base 3.

Next, as illustrated in FIG. 9, second piece 62 of connection member 6 is caused to pass through opening 36 such that antenna module 2 and connection member 6 are accommodated in first recess 31. In this manner, elastic member 7 is positioned between antenna module 2 and bottom 32 of first recess 31 of base 3. Antenna module 2 is positioned at a designated position by positioning protrusion 34 of base 3. As described above, as illustrated in FIG. 9, the designated position is a position where distance d2 between antenna module 2 and inner surface 33 is longer than 0 and shorter than or equal to 1/10 of the wavelength corresponding to the predetermined communication frequency, on at least a part of inner surface 33 of first recess 31.

Next, as illustrated in FIG. 8, waterproof structure 5 is disposed around first recess 31 of base 3.

Next, as illustrated in FIG. 7, radome 4 is attached to base 3. In the exemplary embodiment, since waterproof structure 5 is a double-sided tape, radome 4 is fixed to base 3 by waterproof structure 5. When radome 4 is attached to base 3, radome 4 is positioned at a predetermined position by coupling positioning portion 44 of radome 4 to positioning portion 35 of base 3. As described above, as illustrated in FIG. 5, the predetermined position is a position where center C4 of radome 4 and center C2 of antenna module 2 coincide with each other in a direction (right-left direction in FIG. 5 or width direction of antenna module 2) orthogonal to both of the thickness direction of antenna module 2 and the direction in which antenna elements 2*a* are arranged on antenna surface 20.

In this manner, antenna device 10 is obtained. In antenna device 10, elastic member 7 is disposed between antenna module 2 and bottom 32 of first recess 31 of base 3 in a compressed state in the thickness direction of antenna module 2. In this manner, elastic member 7 causes antenna surface 20 of antenna module 2 to protrude from first recess 31 and be pressed against facing region 412 of bottom surface 411 of second recess 41 of radome 4. Since radome 4 includes spacers 42, distance d1 between antenna surface 20 and facing region 412 is maintained within a range from 1/50 to 1/30, inclusive, of the wavelength corresponding to the predetermined communication frequency.

According to antenna device 10 described above, when antenna module 2 is disposed between radome 4 and base 3, it is possible to suppress deterioration of antenna characteristics due to arrangement variations at the time of assembly and to reduce the influence of sensitivity suppression due to unnecessary radiation from antenna elements 2*a* of antenna module 2. In addition, it is possible to realize a stable operation with good heat dissipation of antenna module 2. In particular, in the exemplary embodiment, base 3 is a part of metal housing 16 of electronic equipment 1, and first surface 30 of base 3 in which first recess 31 is formed is not an inner surface but an outer surface of metal housing 16. Therefore, by disposing antenna module 2 in a limited space and minimizing deterioration of antenna characteristics while suppressing arrangement variations at the time of assembly, both of miniaturization and antenna performance can be achieved.

[1.4 Evaluation]

Hereinafter, results of evaluation of advantages of the configuration of antenna device 10 will be described.

[1.4.1 Conductive Layer of Elastic Member]

Conductive layer 72 of elastic member 7 was evaluated using Configuration Examples 1 and 2 of antenna device 10. Configuration Examples 1 and 2 of antenna device 10 differ from each other in the configuration of conductive layer 72 of elastic member 7. In Configuration Example 1, as described above, conductive layer 72 is formed by winding a conductive sheet around body 71 with the width direction of body 71 as the direction of the central axis. In this manner, in conductive layer 72, first portion 72*a* and second portion 72*b* are connected by third portions 72*c* and 72*d* covering third surface 71*c* and fourth surface 71*d* of body 71, respectively. Conductive layer 72 does not cover fifth surface 71*e* and sixth surface 71*f* of body 71. In Configuration Example 2, conductive layer 72 is formed by winding a conductive sheet around body 71 with the length direction of body 71 as the direction of the central axis. In this case, conductive layer 72 is connected by the third portion in which first portion 72*a* and second portion 72*b* respectively cover fifth surface 71*e* and sixth surface 71*f* of body 71. Conductive layer 72 does not cover third surface 71*c* and fourth surface 71*d* of body 71.

Figure 12A:
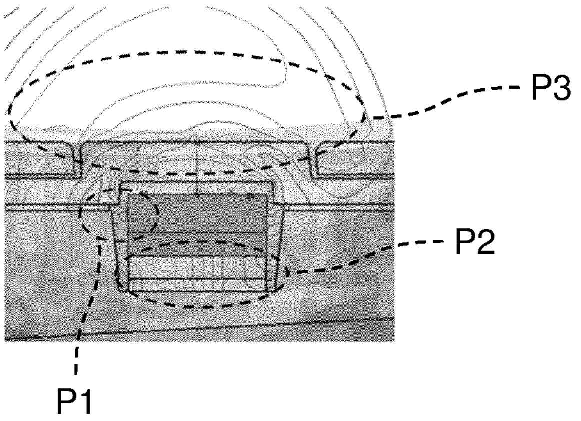
FIG. 12A is an electric field distribution diagram of Configuration Example 1 of the antenna device.
Figure 12B:
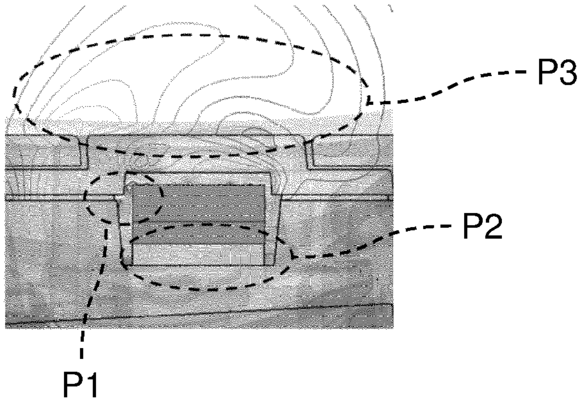
FIG. 12B is an electric field distribution diagram of Configuration Example 2 of the antenna device.

FIG. 12A is an electric field distribution diagram of Configuration Example 1 of antenna device 10, and FIG. 12B is an electric field distribution diagram of Configuration Example 2 of antenna device 10. As is clear from FIGS. 12A and 12B, in a section represented by P1 in the vicinity of an opening of first recess 31 and the gap between inner surface 33 of first recess 31 and antenna module 2, the electric field is strongly distributed in Configuration Example 2, but a peak of the electric field is dispersed in Configuration Example 1. In Configuration Example 1, the electric field is distributed in a section represented by P2 between antenna module 2 and bottom 32 of first recess 31 of base 3. In a section represented by P3 in front of antenna surface 20 of antenna module 2, the influence of reflection by radome 4 is large in Configuration Example 2, but the influence of reflection by radome 4 is improved in Configuration Example 1. Unlike Configuration Example 2, in Configuration Example 1, the electric field on base 3 side of antenna module 2 is not blocked by conductive layer 72 of elastic member 7, and thereby the influence on the radiation characteristics of antenna module 2 can be reduced.

[1.4.2 Opening of Base]

Figure 13A:
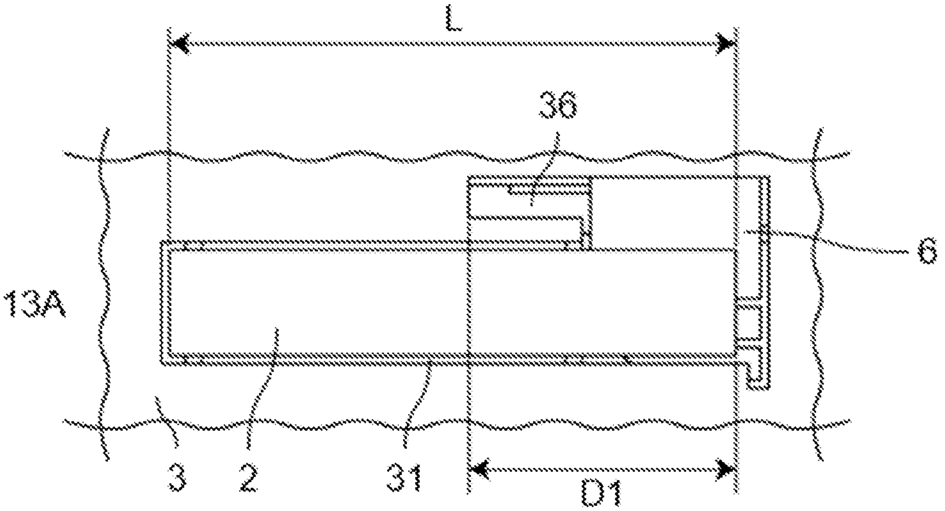
FIG. 13A is a plan view of Configuration Example 3 of the antenna device.
Figure 13B:
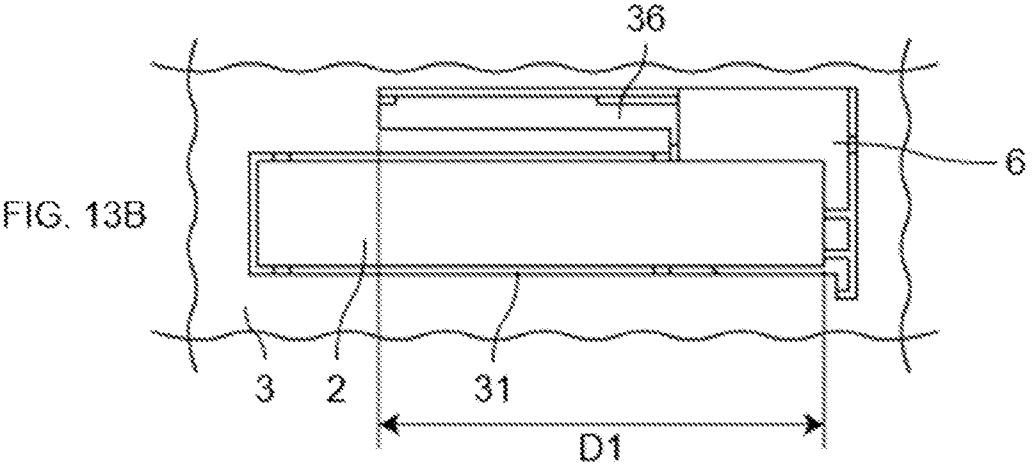
FIG. 13B is a plan view of Configuration Example 4 of the antenna device.
Figure 13C:
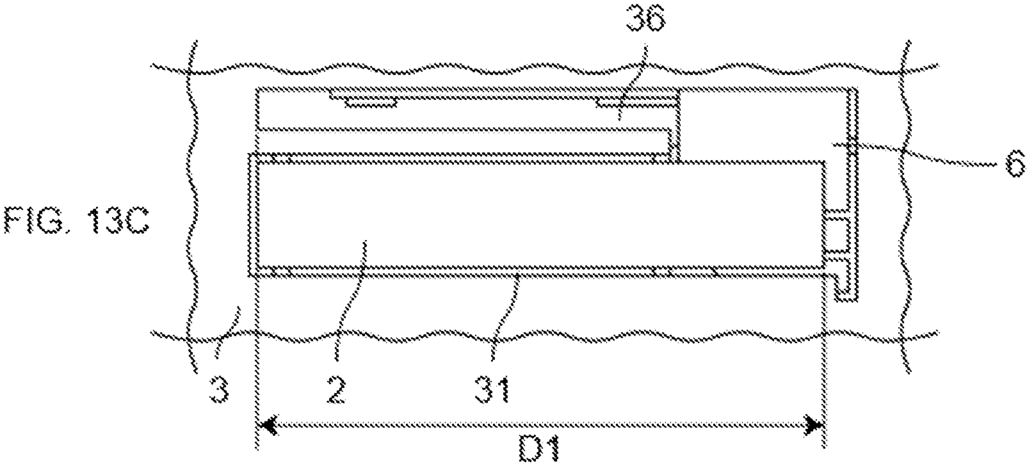
FIG. 13C is a plan view of Configuration Example 5 of the antenna device.

Opening 36 of base 3 was evaluated using Configuration Examples 3 to 6 of antenna device 10. The Configuration Examples 3 to 6 of antenna device 10 differ from each other in the configuration of opening 36 of first recess 31 of base 3. FIG. 13A is a plan view of Configuration Example 3 of antenna device 10, FIG. 13B is a plan view of Configuration Example 4 of antenna device 10, and FIG. 13C is a plan view of Configuration Example 5 of antenna device 10. In Configuration Example 3, in the direction in which antenna elements 2*a* are arranged on antenna surface 20 (length direction of antenna module 2), dimension D1 of opening 36 is ½ of dimension L of antenna module 2. In Configuration Example 4, in the direction in which antenna elements 2*a* are arranged on antenna surface 20 (length direction of antenna module 2), dimension D1 of opening 36 is ⅔ of dimension L of antenna module 2. In Configuration Example 5, in the direction in which antenna elements 2*a* are arranged on antenna surface 20 (length direction of antenna module 2), dimension D1 of opening 36 is equal to dimension L of antenna module 2. In Configuration Example 6, opening 36 is not provided in base 3.

Figure 14:
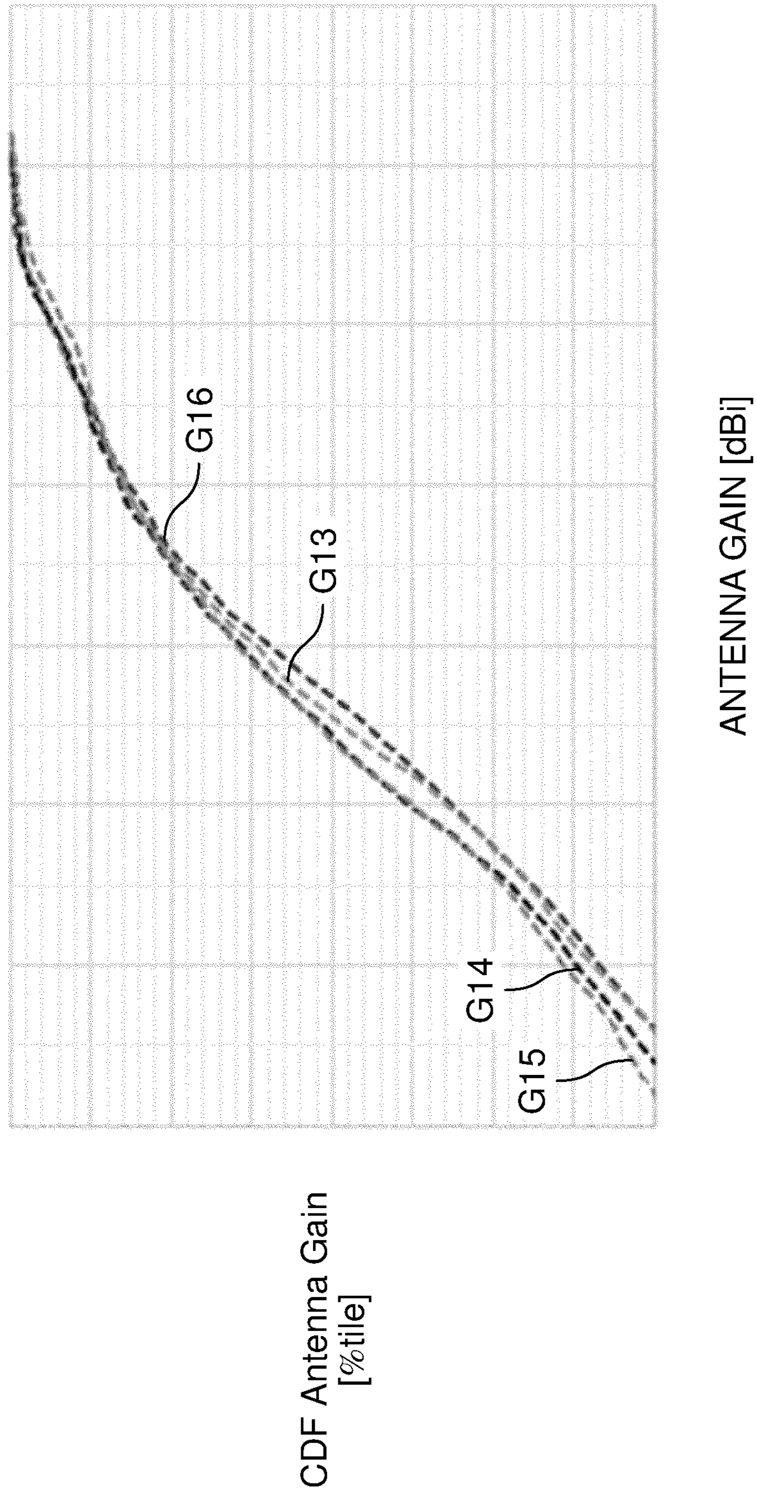
FIG. 14 is a graph of a cumulative distribution function in Configuration Examples 3 to 6 of the antenna device.

FIG. 14 is a graph of a cumulative distribution function in Configuration Examples 3 to 6 of antenna device 10. In FIG. 14, graphs G13 to G16 correspond to Configuration Examples 3 to 6, respectively. As is clear from FIG. 14, graph G16 is on the rightmost side. That is, antenna module 2 has better radiation characteristics without opening 36. However, since graph G13 is generally the same as graph G16, the influence of opening 36 on the radiation characteristics of antenna module 2 is small, when dimension D1 of opening 36 is ½ of dimension L of antenna module 2 as in Configuration Example 3, On the other hand, in a region where the antenna gain is low, graphs G14 and G15 corresponding to Configuration Examples 4 and 5 are shifted toward the left side from graph G16. This means that a probability that the antenna gain will become less than or equal to a predetermined value increases as compared with graph G16. From the above description, it can be found that by setting dimension D1 of opening 36 to ½ of dimension L of antenna module 2, antenna module 2 can be connected to the separate electric circuit (communication circuit 11) while the influence of opening 36 on the radiation characteristics of antenna module 2 is reduced.

[1.4.3 Positioning Protrusion of Base]

Opening 36 of base 3 was evaluated using Configuration Examples 7 and 8 of antenna device 10. Configuration Examples 7 and 8 of antenna device 10 differ from each other in the configuration of positioning protrusion 34 of base 3. In Configuration Example 7, a protruding amount of positioning protrusion 34 from inner surface 33 is set to be larger than 0 and less than or equal to 1/10 of the wavelength corresponding to the predetermined communication frequency. In this manner, distance d2 between antenna module 2 and inner surface 33 is longer than 0 and shorter than or equal to 1/10 of the wavelength corresponding to the predetermined communication frequency, on at least a part of inner surface 33 of first recess 31. For example, distance d2 can be set to 1/18 or 1/27 of a wavelength corresponding to a predetermined communication frequency. In Configuration Example 8, a protruding amount of positioning protrusion 34 from inner surface 33 is set to be longer than 1/10 of the wavelength corresponding to the predetermined communication frequency. In this manner, distance d2 between inner surface 33 of first recess 31 and antenna module 2 becomes longer than 1/10 of the wavelength corresponding to the predetermined communication frequency. For example, distance d2 may be set to ⅕ or ¼ of a wavelength corresponding to a predetermined communication frequency.

Figure 15:
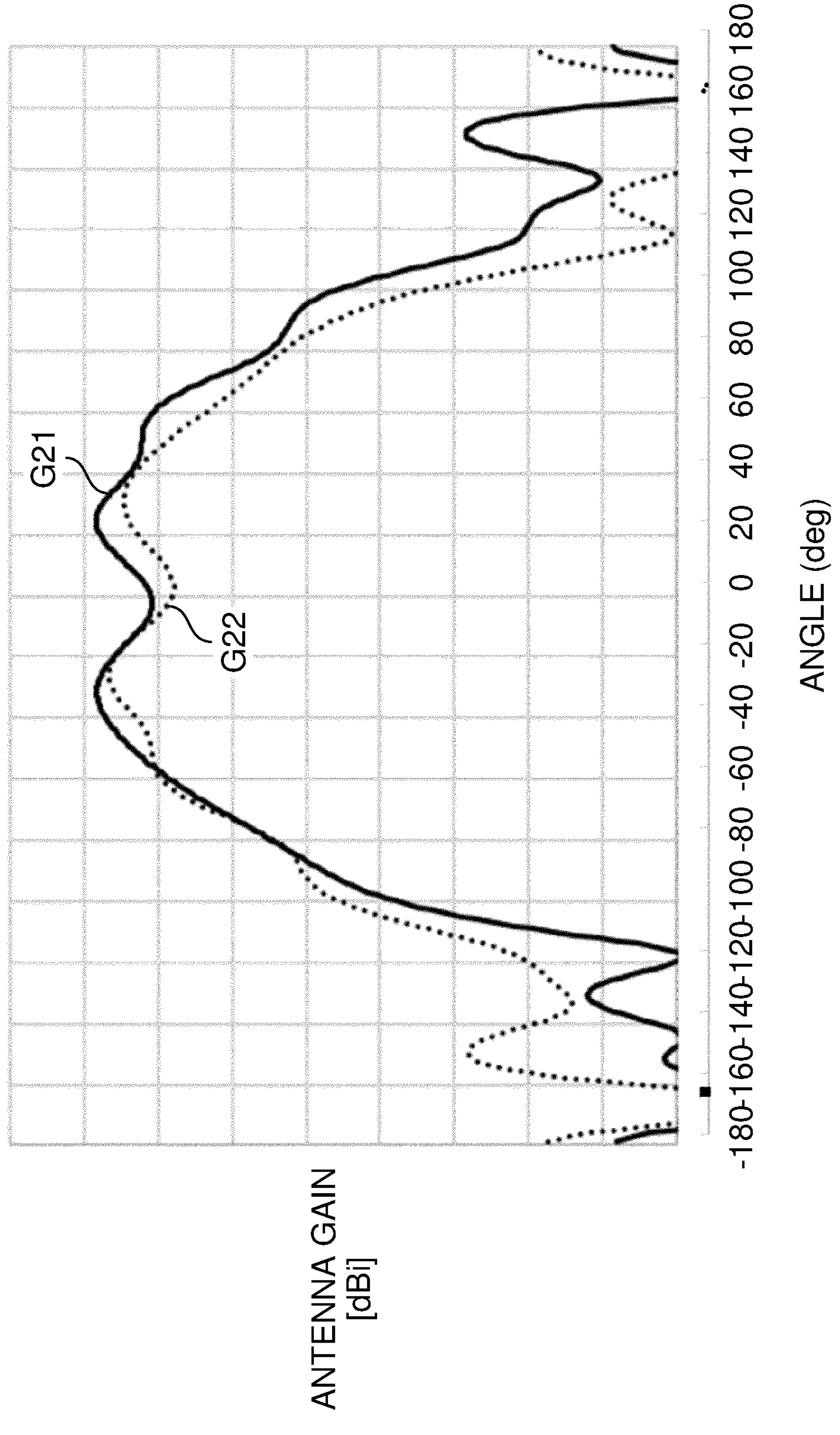
FIG. 15 is a graph of angle dependence of antenna gain for Configuration Examples 7 and 8 of the antenna device.

FIG. 15 is a graph illustrating the angle dependence of the antenna gain for Configuration Examples 7 and 8 of antenna device 10. In FIG. 15, graphs G21 and G22 correspond to Configuration Examples 7 and 8, respectively. In FIG. 15, a direction at an angle of 0 corresponds to the front direction of antenna module 2 (toward antenna surface 20). As can be understood from FIG. 15, the gain in the front direction of antenna module 2 tends to be larger in graph G21 corresponding to Configuration Example 7 than in graph G22 corresponding to Configuration Example 8. In an antenna using a millimeter wave, since the maximum gain is an important index in terms of characteristics, it can be determined that antenna characteristics of Configuration Example 7 is better than antenna characteristics of Configuration Example 8. That is, the antenna characteristics can be improved as antenna module 2 is closer to inner surface 33 of first recess 31 of base 3.

[1.4.4 Conductivity of Base]

Properties of base 3 were evaluated using Configuration Examples 9 and 10 of antenna device 10. In Configuration Examples 9 and 10 of antenna device 10, base 3 is made of different materials. In Configuration Example 9, base 3 is made of metal and has conductivity. In Configuration Example 10, base 3 is a dielectric such as a resin material and does not have conductivity.

Figure 16:
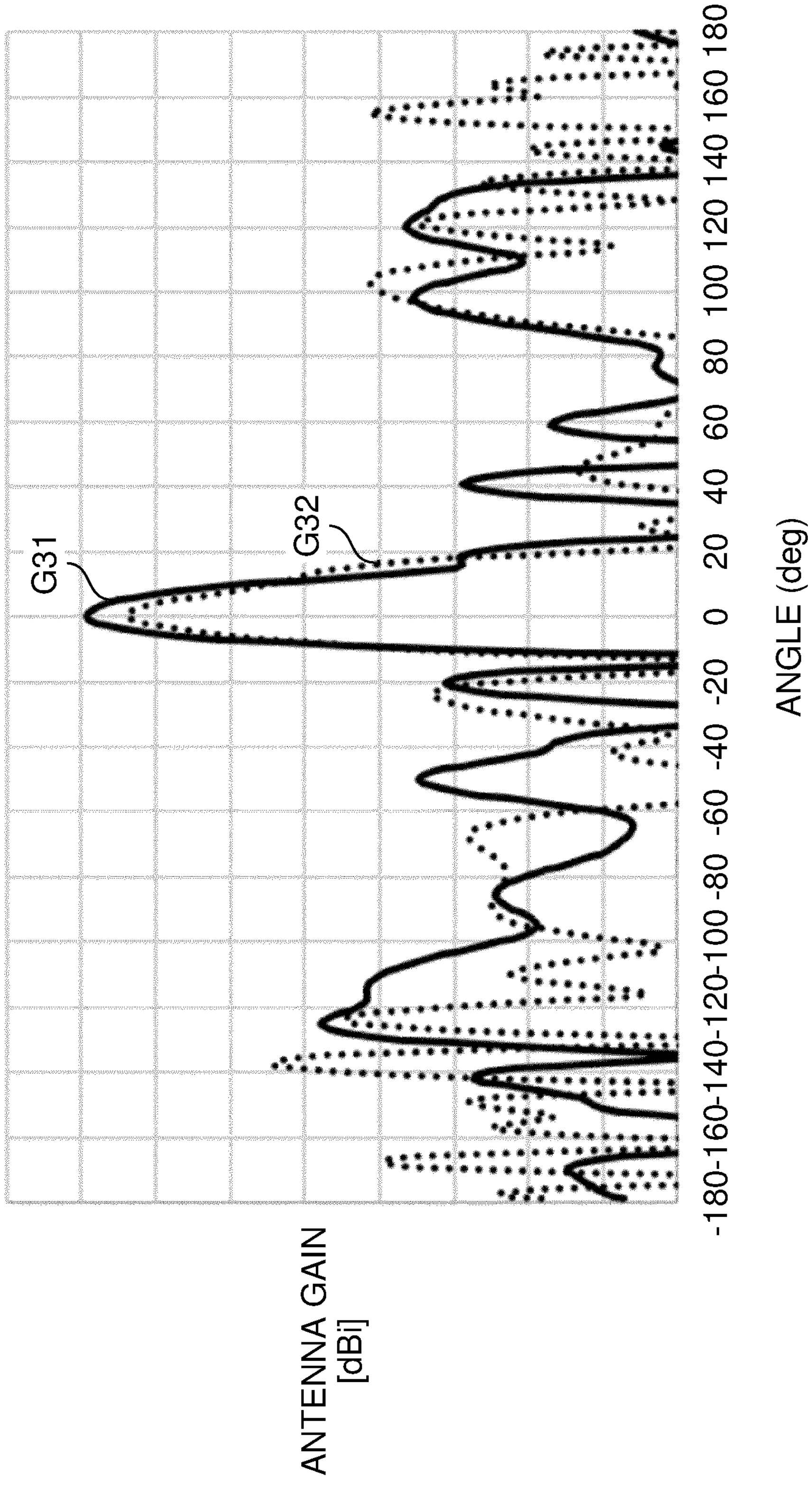
FIG. 16 is a graph of angle dependence of antenna gain for Configuration Examples 9 and 10 of the antenna device.

FIG. 16 is a graph illustrating the angle dependence of the antenna gain for Configuration Examples 9 and 10 of antenna device 10. In FIG. 16, graphs G31 and G32 correspond to Configuration Examples 9 and 10, respectively. In FIG. 16, a direction at an angle of 0 corresponds to the front direction of antenna module 2 (toward antenna surface 20). As can be understood from FIG. 16, the gain in the front direction of antenna module 2 is larger in graph G31 corresponding to Configuration Example 9 than in graph G32 corresponding to Configuration Example 10, and the gain in a back direction of antenna module 2 (toward ground surface 21) tends to decrease. This is considered to be because base 3 made of metal reflects radio waves from antenna module 2 around first recess 31 of base 3. In the antenna using the millimeter wave, since the maximum gain is an important index in terms of characteristics, it can be determined that antenna characteristics of Configuration Example 9 is better than antenna characteristics of Configuration Example 10. That is, when base 3 of antenna module 2 has conductivity, antenna characteristics can be further improved.

2. Modification Examples

Exemplary embodiments of the present disclosure is not limited to the above-described exemplary embodiment. The above-described exemplary embodiment can be variously modified depending on design and the like as long as an object of the present disclosure can be achieved. Hereinafter, modification examples of the above-described exemplary embodiment will be enumerated below. The modification examples to be described below can be applied in an appropriate combination thereof.

Electronic equipment 1 is not limited to the tablet terminal of the above-described exemplary embodiment. Electronic equipment 1 may be equipment having a communication function such as a terminal device and a server. Examples of the terminal device include a personal computer (desktop computer or laptop computer) and a mobile terminal (smartphone, wearable terminal, etc.).

In one modification example, antenna module 2 is not limited to a phased array antenna. Antenna module 2 may be a multiband antenna capable of performing communication in different frequency bandwidths. The shape and number of antenna elements 2*a* are also not particularly limited. That is, antenna module 2 may include only one antenna element 2*a*. The predetermined communication frequency is not limited to the frequency bandwidth of 26 GHz to 300 GHz and may be selected from a desired frequency bandwidth.

In one modification example, base 3 do not need to be a part of metal housing 16 and may be a member independent of metal housing 16. The shape of first recess 31 is not limited to the shape in the above-described exemplary embodiment and may be appropriately set according to the shape of antenna module 2.

In one modification example, positioning protrusion 34 may protrude from bottom 32 of first recess 31, instead of inner surface 33 of first recess 31. The positioning protrusion 34 only needs to position antenna module 2 at the designated position by coming into contact with antenna module 2, and the shape and number of positioning protrusions 34 are not particularly limited.

In one modification example, positioning portion 35 is not limited to the recess and may be a projecting portion or a combination of the recess and the projecting portion. The shape of positioning portion 44 of radome 4 and the presence or absence of positioning portion 44 are determined according to the shape of positioning portion 35 of base 3. Positioning portion 35 is not essential.

In one modification example, not entirety but at least a part of opening 36 may be formed not to overlap antenna module 2 in the thickness direction of antenna module 2. Opening 36 may be adjacent to antenna module 2 in the direction in which antenna elements 2*a* are arranged on antenna surface 20. Each dimension of opening 36 is preferably the dimension described in the above-described exemplary embodiment but is not particularly limited. Opening 36 is not essential.

In one modification example, the shape of radome 4 is not limited to the shape in the above-described exemplary embodiment and may be appropriately set according to the shape of antenna module 2.

In one modification example, spacer 42 may protrude from an inner surface of second recess 41, instead of bottom surface 411 of second recess 41. The shape and number of spacers 42 are not particularly limited as long as spacers 42 come into contact with antenna module 2 to have distance d1 within a range from 1/50 to 1/30, inclusive, of a wavelength corresponding to a predetermined communication frequency.

In one modification example, positioning portion 44 is not limited to the projecting portion, may be a recess, and may be a combination of a projecting portion and a recess. The positioning portion 44 is not essential.

In one modification example, waterproof structure 5 is not limited to the double-sided tape and may be any structure capable of waterproofing a space between first surface 30 of base 3 and second surface 40 of radome 4. Waterproof structure 5 may be, for example, an adhesive or a well-known waterproof member such as a seal or packing. Waterproof structure 5 may be a resin or metal member that covers second portion 4*b* of radome 4 to press second surface 40 of radome 4 against first surface 30 of base 3. Waterproof structure 5 may be a fastening member such as a screw.

In one modification example, connection member 6 is not limited to the configuration in which first piece 61 and second piece 62 are formed by a flexible substrate. For example, first piece 61 and second piece 62 may be separate substrates. In connection member 6, connector 63 is not essential. Second piece 62 does not need to be directly connected to communication circuit 11 and may be connected using an electric wire such as a coaxial cable. Connection member 6 is not essential.

In one modification example, in elastic member 7, conductive layer 72 may have only one of third portions 72*c* and 72*d*. That is, conductive layer 72 may have third portions 72*c* and 72*d* that are present on at least one of both surfaces (third surface 71*c* and fourth surface 71*d*) of body 71 in the direction in which antenna elements 2*a* are arranged on antenna surface 20 and connect first portion 72*a* and second portion 72*b*. Conductive layer 72 may include a portion covering at least one of fifth surface 71*e* and sixth surface 71*f* of body 71. In elastic member 7, at least one of body 71 and conductive layer 72 may have thermal conductivity. As long as the heat dissipation of antenna module 2 is sufficient, elastic member 7 may not necessarily have thermal conductivity. Elastic member 7 is not essential.

3. Aspects

As is apparent from the above-described exemplary embodiment and modification examples, the present disclosure includes the following aspects. In the following, reference marks are given in parentheses only to clarify the correspondence with the exemplary embodiment.

According to a first aspect, antenna device (10) includes: antenna module (2) for performing communication at a predetermined communication frequency; base (3) having conductivity that includes first surface (30) on which first recess (31) is disposed, first recess (31) accommodating antenna module (2); radome (4) that is a dielectric and includes second surface (40) on which second recess (41) is disposed, second surface (40) facing first surface (30) of base (3), second recess (41) facing first recess (31); and waterproof structure (5) for waterproofing a space between first surface (30) of base (3) and second surface (40) of radome (4). Antenna module (2) is accommodated in first recess (31) such that antenna surface (20) on which antenna elements (2*a*) are formed protrudes from first surface (30) into second recess (41). According to this aspect, the waterproofing performance and the antenna performance can be improved.

A second aspect is antenna device (10) based on the first aspect. In the second aspect, bottom surface (411) of second recess (41) includes facing region (412) facing antenna surface (20) and parallel thereto. Distance (d1) between facing region (412) and antenna surface (20) falls within a range from 1/50 to 1/30, inclusive, of a wavelength corresponding to the predetermined communication frequency. According to this aspect, it is possible to suppress a decrease in antenna gain due to reflection of radio waves at radome (4).

A third aspect is antenna device (10) based on the second aspect. In the third aspect, radome (4) includes spacer (42) that is disposed between facing region (412) and antenna surface (20) and causes distance (d1) between facing region (412) and antenna surface (20) to be maintained within the range from 1/50 to 1/30, inclusive, of the wavelength corresponding to the predetermined communication frequency. According to this aspect, distance (d1) between facing region (412) and antenna surface (20) falls within a range from 1/50 to 1/30, inclusive, of the wavelength corresponding to the predetermined communication frequency.

A fourth aspect is antenna device (10) based on the third aspect. In the fourth aspect, spacer (42) does not face antenna elements (2*a*). Distance (d3) between spacer (42) and antenna elements (2*a*) in a plane parallel to antenna surface (20) is longer than or equal to 1/5 of the wavelength corresponding to the predetermined communication frequency. According to this aspect, it is possible to reduce the influence of spacer (42) on the antenna characteristics.

A fifth aspect is antenna device (10) based on any one of the first to fourth aspects. In the fifth aspect, portion (4*a*) covering antenna module (2) in radome (4) is line-symmetric with respect to line (L1) passing through centers of antenna elements (2*a*) arranged in one direction on antenna surface (20). According to this aspect, the gain of antenna module (2) in the front direction (toward antenna surface (20)) can be improved.

A sixth aspect is antenna device (10) based on any one of the first to fifth aspects. In the sixth aspect, radome (4) includes facing portion (4*a*) faces antenna surface (20). A thickness of facing portion (4*a*) falls within a range from 1/10 to 1/8, inclusive, of the wavelength corresponding to the predetermined communication frequency. According to this aspect, the gain of antenna module (2) in the front direction (toward antenna surface (20)) can be improved.

A seventh aspect is antenna device (10) based on any one of the first to sixth aspects. In the seventh aspect, antenna module (2) is disposed at a designated position in first recess (31). The designated position is a position where a distance between inner surface (33) and antenna module (2) is longer than 0 and shorter than or equal to 1/10 of the wavelength corresponding to the predetermined communication frequency, on at least a part of inner surface (33) of the first recess (31). According to this aspect, the gain of antenna module (2) in the front direction (toward antenna surface (20)) can be improved.

An eighth aspect is antenna device (10) based on the seventh aspect. In the eighth aspect, base (3) includes positioning protrusion (34) that comes into contact with antenna module (2) to position antenna module (2) at the designated position. According to this aspect, since antenna module (2) and base (3) are easily aligned, assembly work of antenna device (10) can be easily performed.

A ninth aspect is antenna device (10) based on the eighth aspect. In the ninth aspect, positioning protrusion (34) protrudes from inner surface (33) of first recess (31). According to this aspect, the structure of base 3 can be simplified.

A tenth aspect is antenna device (10) based on any one of the first to ninth aspects. In the tenth aspect, base (3) includes positioning portion (35) that positions radome (4) at a predetermined position where center (C4) of radome (4) coincides with center (C2) of antenna module (2) in a direction orthogonal to both of a thickness direction of antenna module (2) and a direction in which antenna elements (2*a*) are arranged on antenna surface (20). According to this aspect, the influence of radome (4) on the antenna radiation characteristics of antenna module (2) can be reduced. According to this aspect, since radome (4) and antenna module (2) are easily aligned, assembly work of antenna device (10) can be easily performed.

An eleventh aspect is antenna device (10) based on any one of the first to tenth aspects. In the eleventh aspect, base (3) includes opening (36) penetrating bottom (32) of first recess (31). Opening (36) does not overlap antenna module (2) in a thickness direction of antenna module (2). According to this aspect, antenna module (2) can be connected to a separate electric circuit (communication circuit (11)) while an influence of opening (36) on the radiation characteristics of antenna module (2) is reduced.

A twelfth aspect is antenna device (10) based on the eleventh aspect. In the twelfth aspect, opening (36) is adjacent to antenna module (2) in a direction orthogonal to both of the thickness direction of antenna module (2) and a direction in which antenna elements (2*a*) are arranged on antenna surface (20). According to this aspect, a wiring length suitable for connection of antenna module (2) to the separate electric circuit (communication circuit (11)) can be shortened.

A thirteenth aspect is antenna device (10) based on the eleventh or twelfth aspect. In the thirteenth aspect, dimension (D1) of opening (36) is smaller than or equal to 1/2 of a dimension of the antenna module in a direction in which antenna elements (2*a*) are arranged on antenna surface (20). According to this aspect, antenna module (2) can be connected to a separate electric circuit (communication circuit (11)) while an influence of opening (36) on the radiation characteristics of antenna module (2) is reduced.

A fourteenth aspect is antenna device (10) based on any one of the eleventh to thirteenth aspects. In the fourteenth aspect, a dimension of opening (36) is smaller than or equal to 1/3 of a wavelength corresponding to the predetermined communication frequency in a direction orthogonal to both of the thickness direction of antenna module (2) and a direction in which antenna elements (2*a*) are arranged on antenna surface (20). According to this aspect, antenna module (2) can be connected to a separate electric circuit (communication circuit (11)) while an influence of opening (36) on the radiation characteristics of antenna module (2) is reduced.

A fifteenth aspect is antenna device (10) based on any one of the eleventh to fourteenth aspects. In the fifteenth aspect, antenna device (10) further includes connection member (6) for connecting antenna module (2) to communication circuit (11). Connection member (6) includes first piece (61) that is connected to antenna module (2) and extends from antenna module (2) toward opening (36), and second piece (62) that extends from a tip of first piece (61) through opening (36) and is connected to communication circuit (11). According to this aspect, connection between antenna module (2) and communication circuit (11) is facilitated.

A sixteenth aspect is antenna device (10) based on the fifteenth aspect. In the sixteenth aspect, first piece (61) and second piece (62) are formed by bending a flexible substrate. According to this aspect, connection member (6) can be easily provided.

A seventeenth aspect is antenna device (10) based on any one of the first to sixteenth aspects. In the seventeenth aspect, antenna device (10) further includes elastic member (7) disposed in a compressed state in a thickness direction of antenna module (2) between antenna module (2) and bottom (32) of first recess (31) of base (3). According to this aspect, variations in performance of antenna device (10) due to variations in distance between antenna module (2) and radome (4) can be reduced, and a yield can be improved.

An eighteenth aspect is the antenna device (10) based on the seventeenth aspect. In the eighteenth aspect, elastic member (7) includes body (71) having elasticity, and conductive layer (72) disposed on a front surface of body (71) to connect ground surface (21) of antenna module (2) to base (3). According to this aspect, since base (3) can be used as the ground of antenna module (2), the influence of sensitivity suppression due to unnecessary radiation from antenna module (2) can be reduced.

A nineteenth aspect is the antenna device (10) based on the eighteenth aspect. In the nineteenth aspect, conductive layer (72) includes first portion (72*a*) that is present on the surface (first surface 71*a*) of body (71) facing antenna module (2) and is connected to antenna module (2), the second portion that is present on the surface (second surface 71*b*) of body (71) on an opposite side to antenna module (2) and is connected to base (3), and third portions (71*c* and 71*d*) that are present on at least one of both surfaces (third surface 71*c* and fourth surface 71*d*) of body (71) in the direction in which antenna elements (2*a*) are arranged on antenna surface (20) and connect first portion (72*a*) and second portion (72*b*). According to this aspect, it is possible to reduce the influence of conductive layer (72) on the radiation characteristics of antenna module (2).

A twentieth aspect is antenna device (10) based on the eighteenth or nineteenth aspect. In the twentieth aspect, elastic member (7) has thermal conductivity. According to this aspect, heat generated in antenna module (2) can be transmitted to base (3) via elastic member (7), and heat dissipation of antenna device (10) can be improved.

A twenty-first aspect is antenna device (10) based on any one of the first to twentieth aspects. In the twenty-first aspect, the predetermined communication frequency is included in a frequency bandwidth of 26 GHz to 300 GHz. According to this aspect, a communication speed by antenna device (10) can be improved.

A twenty-second aspect is electronic equipment (1) including: antenna device (10) based on any one of the first to twenty-first aspects; communication circuit (11) connected to antenna device (10); and metal housing (16) that accommodates communication circuit (11). Base (3) is apart of metal housing (16). First surface (30) of base (3) is an outer surface of metal housing (16). According to this aspect, the waterproofing performance and the antenna performance can be improved.

The present disclosure relates to an antenna device and electronic equipment. Specifically, the present disclosure is applicable to an antenna device in which an antenna module needs to be waterproof, and electronic equipment including a metal housing.

What is claimed is:

1. An antenna device comprising:
an antenna module for performing communication at a predetermined communication frequency;
a base having conductivity, the base including a first surface and a first recess, the first recess accommodating the antenna module and being disposed on the first surface;
a radome that is a dielectric, the radome including a second surface facing the first surface of the base and a second recess which faces the first recess and is disposed on the second surface; and
a waterproof structure for waterproofing the antenna module, the waterproof structure being disposed between the first surface of the base and the second surface of the radome,
wherein the antenna module includes
one or a plurality of antenna elements, and
an antenna surface on which the one or plurality of antenna elements are disposed, and
the antenna module is accommodated in the first recess to cause the antenna surface to project from the first surface into the second recess.

2. The antenna device according to claim 1, wherein
a bottom surface of the second recess includes a facing region facing the antenna surface and parallel to the antenna surface, and
a distance between the facing region and the antenna surface falls within a range from 1/50 to 1/30, inclusive, of a wavelength corresponding to the predetermined communication frequency.

3. The antenna device according to claim 2, wherein the radome includes a spacer that is disposed between the facing region and the antenna surface and causes the distance between the facing region and the antenna surface to be maintained within the range from 1/50 to 1/30, inclusive, of the wavelength corresponding to the predetermined communication frequency.

4. The antenna device according to claim 3, wherein
the spacer does not face the one or plurality of antenna elements, and
a distance between the spacer and each of the one or plurality of antenna elements in a plane parallel to the antenna surface is longer than or equal to 1/5 of the wavelength corresponding to the predetermined communication frequency.

5. The antenna device according to claim 1, wherein a portion covering the antenna module in the radome is line-symmetric with respect to a line passing through centers of the plurality of antenna elements arranged in one direction on the antenna surface.

6. The antenna device according to claim 1, wherein
the radome includes a facing portion facing the antenna surface, and
a thickness of the facing portion falls within a range from 1/10 to 1/8, inclusive, of the wavelength corresponding to the predetermined communication frequency.

7. The antenna device according to claim 1, wherein
the antenna module is disposed at a designated position in the first recess, and
the designated position is a position where a distance between at least a part of an inner surface of the first recess and the antenna module is longer than 0 and shorter than or equal to 1/10 of the wavelength corresponding to the predetermined communication frequency.

8. The antenna device according to claim 7, wherein the base includes a positioning protrusion that comes into contact with the antenna module to position the antenna module at the designated position.

9. The antenna device according to claim 8, wherein the positioning protrusion protrudes from the inner surface of the first recess.

10. The antenna device according to claim 1, wherein the base includes a positioning portion that positions the radome at a predetermined position where a center of the radome coincides with a center of the antenna module in a direction orthogonal to both of a thickness direction of the antenna module and a direction in which the plurality of antenna elements are arranged on the antenna surface.

11. The antenna device according to claim 1, wherein
the base includes an opening penetrating a bottom of the first recess, and
at least a part of the opening does not overlap the antenna module in a thickness direction of the antenna module.

12. The antenna device according to claim 11, wherein the opening is adjacent to the antenna module in a direction orthogonal to both of the thickness direction of the antenna module and a direction in which the plurality of antenna elements are arranged on the antenna surface.

13. The antenna device according to claim 11, wherein a dimension of the opening is smaller than or equal to 1/2 of a dimension of the antenna module in a direction in which the plurality of antenna elements are arranged on the antenna surface.

14. The antenna device according to claim 11, wherein a dimension of the opening is smaller than or equal to 1/3 of a wavelength corresponding to the predetermined communication frequency in a direction orthogonal to both of the thickness direction of the antenna module and a direction in which the plurality of antenna elements are arranged on the antenna surface.

15. The antenna device according to claim 11, further comprising a connection member for connecting the antenna module to a communication circuit, wherein the connection member includes a first piece that is connected to the antenna module and extends from the antenna module toward the opening, and a second piece that extends from a tip of the first piece through the opening and is connected to the communication circuit.

16. The antenna device according to claim 15, wherein the first piece and the second piece are formed by bending a flexible substrate.

17. The antenna device according to claim 1, further comprising an elastic member disposed in a compressed state in a thickness direction of the antenna module between the antenna module and a bottom of the first recess of the base.

18. The antenna device according to claim 17, wherein the elastic member includes a body having elasticity, and a conductive layer disposed on a front surface of the body to connect a ground surface of the antenna module to the base.

19. The antenna device according to claim 18, wherein the body includes a first surface facing the antenna module, a second surface on an opposite side to the antenna module, and a third surface and a fourth surface arranged in a direction in which the plurality of antenna elements are arranged on the antenna surface, and the conductive layer includes a first portion that is on the first surface of the body and is connected to the antenna module, a second portion that is on the second surface of the body and is connected to the base, and a third portion that is provided on at least one of the third surface and the fourth surface of the body and connects the first portion and the second portion.

20. The antenna device according to claim 18, wherein the elastic member has thermal conductivity.

21. The antenna device according to claim 1, wherein the waterproof structure is a joining member that joins the second surface of the radome to the first surface of the base.

22. The antenna device according to claim 1, wherein the predetermined communication frequency is included in a frequency bandwidth of 26 GHz to 300 GHz, inclusive.

23. Electronic equipment comprising:

the antenna device according to claim 1;

a communication circuit connected to the antenna device; and a metal housing that accommodates the communication circuit, wherein the base is a part of the metal housing, and the first surface of the base is an outer surface of the metal housing.

* * * * *